(12) United States Patent
Park et al.

(10) Patent No.: US 10,567,696 B2
(45) Date of Patent: Feb. 18, 2020

(54) BROADCAST RECEIVING APPARATUS AND CONTROL METHOD THEREOF

(71) Applicant: SAMSUNG ELECTRONICS CO., LTD., Suwon-si (KR)

(72) Inventors: Ji Yeon Park, Suwon-si (KR); Ji Eun Park, Suwon-si (KR); Dong Hoon Kang, Suwon-si (KR); Jin Hwa Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/198,405

(22) Filed: Nov. 21, 2018

(65) Prior Publication Data

US 2019/0166326 A1    May 30, 2019

(30) Foreign Application Priority Data

Nov. 24, 2017    (KR) .................. 10-2017-0158694

(51) Int. Cl.
*H04N 5/50*    (2006.01)
*H04N 5/445*    (2011.01)

(52) U.S. Cl.
CPC ........... *H04N 5/50* (2013.01); *H04N 5/44513* (2013.01); *H04N 2005/44517* (2013.01)

(58) Field of Classification Search
CPC .......................... H04N 5/50; H04N 5/44513
USPC ....... 348/570, 567, 523, 706, 714, 716, 719, 348/723, 725, 721, 729, 732; 455/3.02, 455/179.1, 184.1, 185.1, 186.1, 187.1; 725/72, 151
See application file for complete search history.

(56) References Cited

U.S. PATENT DOCUMENTS

| 5,585,865 A | * | 12/1996 | Amano | H04N 5/44543 348/734 |
| 6,427,238 B1 | * | 7/2002 | Goodman | H04N 7/163 348/552 |
| 6,598,226 B1 | * | 7/2003 | Sorensen | H04N 7/163 348/E5.105 |
| 7,561,213 B2 | * | 7/2009 | Okamoto | H01Q 1/22 343/876 |
| 7,564,503 B2 | * | 7/2009 | Onomatsu | H04N 5/4401 348/570 |
| 7,793,319 B2 | * | 9/2010 | Anderson | H04N 5/50 725/151 |
| 7,808,562 B2 | * | 10/2010 | Yen | H04N 5/4401 348/570 |

(Continued)

FOREIGN PATENT DOCUMENTS

KR    10-2012-0125360 A    11/2012
KR    10-2016-0060019 A    5/2016
(Continued)

OTHER PUBLICATIONS

"ATSC Standard: ATSC 3.0 System", Oct. 19, 2017, Advanced Television Systems Committee, ATSC A/300:2017, (56 pages total).

(Continued)

*Primary Examiner* — Jefferey F Harold
*Assistant Examiner* — Mustafizur Rahman
(74) *Attorney, Agent, or Firm* — Sughrue Mion, PLLC

(57)    ABSTRACT

A broadcast receiving for updating service map information by scanning the broadcast signal when signaling information included in a broadcast signal has been changed.

19 Claims, 14 Drawing Sheets

(56) References Cited

U.S. PATENT DOCUMENTS

| | | | | |
|---|---|---|---|---|
| 8,294,830 | B2* | 10/2012 | Furutani | H04H 60/43 |
| | | | | 348/570 |
| 8,442,463 | B2* | 5/2013 | Lo | H04B 1/16 |
| | | | | 455/161.2 |
| 2002/0186327 | A1* | 12/2002 | Inui | H04H 40/18 |
| | | | | 348/732 |
| 2004/0061807 | A1* | 4/2004 | Song | H04N 5/44513 |
| | | | | 348/731 |
| 2004/0155986 | A1* | 8/2004 | Horita | H04N 5/44 |
| | | | | 348/731 |
| 2004/0207764 | A1* | 10/2004 | Naoi | H03J 1/0075 |
| | | | | 348/732 |
| 2005/0034173 | A1* | 2/2005 | Hatanaka | H04H 60/50 |
| | | | | 725/151 |
| 2005/0091680 | A1* | 4/2005 | Kondo | H04N 7/163 |
| | | | | 725/12 |
| 2005/0287968 | A1* | 12/2005 | Takagi | H04B 7/0814 |
| | | | | 455/179.1 |
| 2005/0289625 | A1* | 12/2005 | Takagi | H04N 5/44 |
| | | | | 725/100 |
| 2006/0230429 | A1* | 10/2006 | Van Horck | H03J 1/0058 |
| | | | | 725/135 |
| 2008/0028425 | A1* | 1/2008 | Inui | H04N 5/4401 |
| | | | | 725/38 |
| 2008/0303960 | A1* | 12/2008 | Shioji | H04N 5/50 |
| | | | | 348/731 |
| 2009/0180037 | A1* | 7/2009 | Onomatsu | H01Q 3/30 |
| | | | | 348/732 |
| 2011/0051012 | A1* | 3/2011 | Miyazaki | H04N 21/235 |
| | | | | 348/731 |
| 2011/0090887 | A1 | 4/2011 | Kim et al. | |
| 2012/0133840 | A1 | 5/2012 | Shirasuka et al. | |
| 2013/0141650 | A1* | 6/2013 | Jeong | H04N 5/50 |
| | | | | 348/732 |
| 2015/0009412 | A1 | 1/2015 | Lee | |
| 2016/0007075 | A1 | 1/2016 | Heo | |
| 2017/0134763 | A1 | 5/2017 | Hwang et al. | |

FOREIGN PATENT DOCUMENTS

| | | |
|---|---|---|
| WO | 2011111917 A1 | 9/2011 |
| WO | 2015194904 A1 | 12/2015 |

OTHER PUBLICATIONS

"ATSC Standard: A/321, System Discovery and Signaling", Mar. 23, 2016, Advanced Television Systems Committee, ATSC A/321:2016, (28 pages total).

"ATSC Standard: Physical Layer Protocol", Jun. 6, 2017, Advanced Television Systems Committee, ATSC A/322:2017, (262 total pages).

"ATSC Standard: Scheduler/Studio to Transmitter Link", Jan. 5, 2018, Advanced Television Systems Committee, ATSC A/324:2018, (83 pages total).

"ATSC Standard: Link-Layer Protocol (A/330)", Sep. 19, 2016, Advanced Television Systems Committee, ATSC A/330:2016, (48 pages total).

"ATSC Standard: Signaling, Delivery, Synchronization, and Error Protection", Dec. 6, 2017, Advanced Television Systems Committee, ATSC A/331:2017, (205 pages total).

"ATSC Standard: Service Announcement", Dec. 6, 2017, Advanced Television Systems Committee, ATSC A/332:2017, (34 pages total).

"ATSC Standard: Service Usage Reporting (A/333)", Jan. 4, 2017, Advanced Television Systems Committee, ATSC A/333:2017, (19 pages total).

"ATSC Standard: Audio Watermark Emission (A/334)", Sep. 19, 2016, Advanced Television Systems Committee, ATSC A/334:2016, (10 pages total).

"ATSC Standard: Video Watermark Emission (A/335)", Sep. 20, 2016, Advanced Television Systems Committee, ATSC A/335:2016, (15 pages total).

"ATSC Standard: Content Recovery in Redistribution Scenarios", Apr. 24, 2018, Advanced Television Systems Committee, ATSC N336:2018, (58 pages total).

"ATSC Standard: Application Signaling", Jan. 2, 2018, Advanced Television Systems Committee, ATSC A/337:2018, (35 pages total).

"ATSC Standard: Companion Device", Apr. 17, 2017, Advanced Television Systems Committee, ATSC A/338:2017, (49 pages total).

"ATSC Standard: Video—HEVC", Aug. 28, 2018, Advanced Television Systems Committee, ATSC A/341:2018, (38 pages total).

"ATSC Standard: ATSC A/342 Part 1, Audio Common Elements", Jan. 24, 2017, Advanced Television Systems Committee, ATSC A/342-1:2017, (16 pages total).

"ATSC Standard: ATSC A/342 Part 2, AC-4 System", Feb. 23, 2017, Advanced Television Systems Committee, ATSC A/342-2:2017, (18 pages total).

"ATSC Standard: A/342 Part 3, MPEG-H System", Mar. 3, 2017, Advanced Television Systems Committee, ATSC A/342-3:2017, (20 total pages).

"ATSC Standard: Captions and Subtitles (A/343)", Oct. 10, 2018, Advanced Television Systems Committee, ATSC A/343:2018, (16 pages total).

"ATSC Standard: ATSC 3.0 Interactive Content", Dec. 18, 2017, Advanced Television Systems Committee, ATSC A/344:2017, (134 total pages).

"ATSC Standard: ATSC 3.0 Security and Service Protection", Jan. 9, 2018, Advanced Television Systems Committee, ATSC A/360:2018, (33 pages total).

International Search Report (PCT/ISA/210) and Written Opinion (PCT/ISA/237) dated Mar. 20, 2019 issued by the International Searching Authority in International Application No. PCT/KR2018/014427.

* cited by examiner

BROADCAST RECEIVING APPARATUS AND CONTROL METHOD THEREOF

CROSS-REFERENCE TO RELATED APPLICATION(S)

This application is based on and claims priority under 35 U.S.C. § 119 to Korean Patent Application No. 10-2017-0158694 filed on Nov. 24, 2017, in the Korean Intellectual Property Office, the disclosure of which is incorporated by reference herein in its entirety.

BACKGROUND

1. Field

The disclosure relates to a broadcast receiving apparatus, which is tuned to a broadcast signal and performs a process to provide one of broadcast services, and a control method thereof, and more particularly to a broadcast receiving apparatus, which has a structure to be tuned to a broadcast signal based on previously stored broadcast service map information, and a control method thereof.

2. Description of the Related Art

A broadcast receiving apparatus refers to an apparatus for processing a broadcast signal provided from a broadcast service provider, such as a broadcasting station, and may be implemented as a television (TV) or the like for reproducing a broadcast service image, or a set-top box or the like for outputting a processed broadcast signal to an external device, such as a TV for reproduction of the broadcast service image. The broadcast service provider transmits a broadcast signal in accordance with various transmission/reception standards, and the broadcast receiving apparatus receives and processes the broadcast signal.

A conventional broadcast service providing method has been employed in a style of a provider-centered service, in which the broadcasting station provides broadcast content including video and audio content at a previously scheduled time, and a user simply watches the broadcast content through the TV at the corresponding time. However, recent development of the Internet has made consumption of media content possible in various terminals while surpassing spatiotemporal limits. Further, an interactive method of using information appended to the corresponding content to consume supplemental media content has been developed, and therefore there is a need of changing a terrestrial broadcast service method of a conventional simple watching style into a method of supporting a new service consumption style. In addition, the video and audio content of the broadcast content are also required to have more improved quality than the conventional content.

The Advanced Television Systems Committee (ATSC), which establishes new broadcasting standards, has proposed ATSC 3.0 standards to achieve change in such a style of providing and consuming service, and improvement in quality of content. The ATSC 3.0 standards are characterized in combining two broadcast and broadband services for media based on an Internet protocol (IP), and are provided to support a hybrid service of standards based on a user datagram protocol (UDP) and the IP, and an image including a framework to provide a broadcasting environment in static and dynamic reception equipment and having quality of ultra-high definition (UHD).

In order for the broadcast receiving apparatus to be tuned to a broadcast signal of the ATSC 3.0 standards through one of the broadcast services, the broadcast receiving apparatus acquires signaling information from the broadcast signal. However, if the broadcast signal is fully scanned every time the signaling information is acquired, high system load and elevated processing time are required. Thus, the broadcast receiving apparatus acquires the signaling information according to the broadcast services by fully scanning the broadcast signal at a certain point in time, stores the acquired signaling information as a service map, and is then tuned to the broadcast signal based on information about the previously stored service map at a future point in time.

The signaling information in the previously stored service map may not match with that of a broadcast signal received at a current point in time, for various reasons such as a broadcast signal changed in a configuration by the broadcast service provider, etc. If this instance, because the signaling information is inconsistent, the appropriate broadcast signal may not be tuned, and a broadcast service image is not normally displayed. In this case, a user cannot know why the broadcast service image is not normally displayed. For example, such a problem may occur because the broadcast receiving apparatus may be out of order, the broadcast signal may not be being received, and so on. Therefore, a method of normally providing a broadcast service corresponding to a broadcast signal is needed even though the broadcast signal provided to the broadcast receiving apparatus is changed in a configuration.

SUMMARY

In accordance with an aspect of the disclosure, there is provided a broadcast receiving apparatus including: a memory; a receiver configured to receive a broadcast signal, the broadcast signal comprising data of a plurality of channels and signaling information; a processor configured to: store service map information to be tuned to the plurality of channels in the memory, based on scanning the broadcast signal, determine that the signaling information included in the broadcast signal is updated with respect to the service map information, and update the service map information by scanning the broadcast signal, in response to determining that the signaling information included in the broadcast signal is updated with respect to the service map information. Thus, a broadcast service corresponding to a broadcast signal is normally provided even though the broadcast signal provided to the broadcast receiving apparatus is changed in a configuration.

The broadcast signal may include data of the plurality of channels to be transmitted through a plurality of sub frames within a certain frequency frame, and the processor may determine that the signaling information included in the broadcast signal is updated with respect to the service map information, when a certain channel is selected and a sub frame of the certain channel does not match with the broadcast signal, the sub frame being designated in the service map information.

The service map information may designate identification (ID) of a sub frame that provides the signaling information to determine at least one of providing the selected channel among the plurality of sub frames, and the processor may determine that the signaling information included in the broadcast signal is updated with respect to the service map information when it is determined that the sub frame of the broadcast signal having the ID designated in the service map information does not include the signaling information.

The plurality of sub frames of the broadcast signal may each include flag information for indicating whether the signaling information is included therein, and the processor may determine whether the sub frame includes the signaling information based on the flag information.

When a certain channel is selected and no data of the selected channel is acquired from the broadcast signal tuned based on the service map information, the processor may search for data of the selected channel by scanning a frequency band of the selected channel and update the service map information according to the searching results.

The processor may display a user interface (UI) for informing a scanning operation state while scanning the frequency band of the selected channel, and display an image corresponding to the selected channel without displaying the UI when the service map information is completely updated.

When a certain channel is selected and the broadcast signal is scanned, the processor may scan a frequency band of the certain channel within a full frequency band of the broadcast signal.

The processor may stop an updating operation and stores a progress history of the updating operation when a certain channel is selected and an instruction for switching over to another frequency band is received at a first point in time during the updating operation for the service map information, and resume the updating operation based on the progress history when an instruction for switching over to a frequency band of the selected channel is received at a second point in time after the first point in time.

The broadcast signal may comply with Advanced Television Systems Committee (ATSC) 3.0 standard.

The processor may be tuned to a broadcast signal of a channel based on the service map information stored in the storage when the channel is selected and the service map information stored in the storage matches with the broadcast signal.

In accordance with an aspect of the disclosure, there is provided a method of controlling a broadcast receiving apparatus, the method including: storing service map information to be tuned to a plurality of channels based on scanning a broadcast signal, the broadcast signal comprising data of the plurality of channels and signaling information; receiving a broadcast signal; determining that the signaling information included in the broadcast signal is updated with respect to the service map information; and updating the service map information by scanning the broadcast signal, in response to determining that the signaling information included in the broadcast signal is updated with respect to the service map information.

The broadcast signal may include data of the plurality of channels to be transmitted through a plurality of sub frames within a certain frequency frame, and the determining of whether the signaling information has been changed may include determining that the signaling information included in the broadcast signal is updated with respect to the service map information, when a certain channel is selected and a sub frame of the selected channel does not match with the broadcast signal, the sub frame being designated in the service map information.

The service map information may designate identification (ID) of a sub frame that provides the signaling information to determine at least one of providing the selected channel among the plurality of sub frames, and the determining of whether the signaling information is updated with respect to the service map information may include determining that the signaling information included in the broadcast signal is updated with respect to the service map information when it is determined that the sub frame of the broadcast signal having the ID designated in the service map information does not include the signaling information.

The plurality of sub frames of the broadcast signal may each include flag information for indicating whether the signaling information is included therein, and the determining of whether the signaling information is updated with respect to the service map information may include determining whether the sub frame includes the signaling information based on the flag information.

The updating of the service map information may include searching for data of a certain channel by scanning a frequency band of the selected channel and updating the service map information according to the searching results when the certain channel is selected and no data of the selected channel is acquired from the broadcast signal tuned based on the service map information.

The updating of the service map information may include displaying a user interface (UI) for informing a scanning operation state while scanning the frequency band of the selected channel, and displaying an image corresponding to the selected channel without displaying the UI when the service map information is completely updated.

The updating of the service map information may include scanning a frequency band of the certain channel within a full frequency band of the broadcast signal when the certain channel is selected and the broadcast signal is scanned.

The updating of the service map information may include stopping an updating operation and stores a progress history of the updating operation when a certain channel is selected and an instruction for switching over to another frequency band is received at a first point in time during the updating operation for the service map information, and resuming the updating operation based on the progress history when an instruction for switching over to a frequency band of the selected channel is received at a second point in time after the first point in time.

The broadcast signal may comply with Advanced Television Systems Committee (ATSC) 3.0 standard.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EMBODIMENTS

Below, embodiments will be described in detail with reference to accompanying drawings. Further, the embodiments described with reference to the accompanying drawings are not exclusive to each other unless otherwise mentioned, and a plurality of embodiments may be selectively combined. The combination of these plural embodiments may be discretionally selected and applied to realize one or more aspects of the disclosure by a person having an ordinary skill in the art to which this disclosure pertains.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Expressions such as "at least one of," when preceding a list of elements, modify the entire list of elements and do not modify the individual elements of the list. For example, the expressions "at least one of a, b, and c" and "at least one of a, b, and/or c" should be understood as including only a, only b, only c, both a and b, both a and c, both b and c, or all of a, b, and c.

Figure 1:
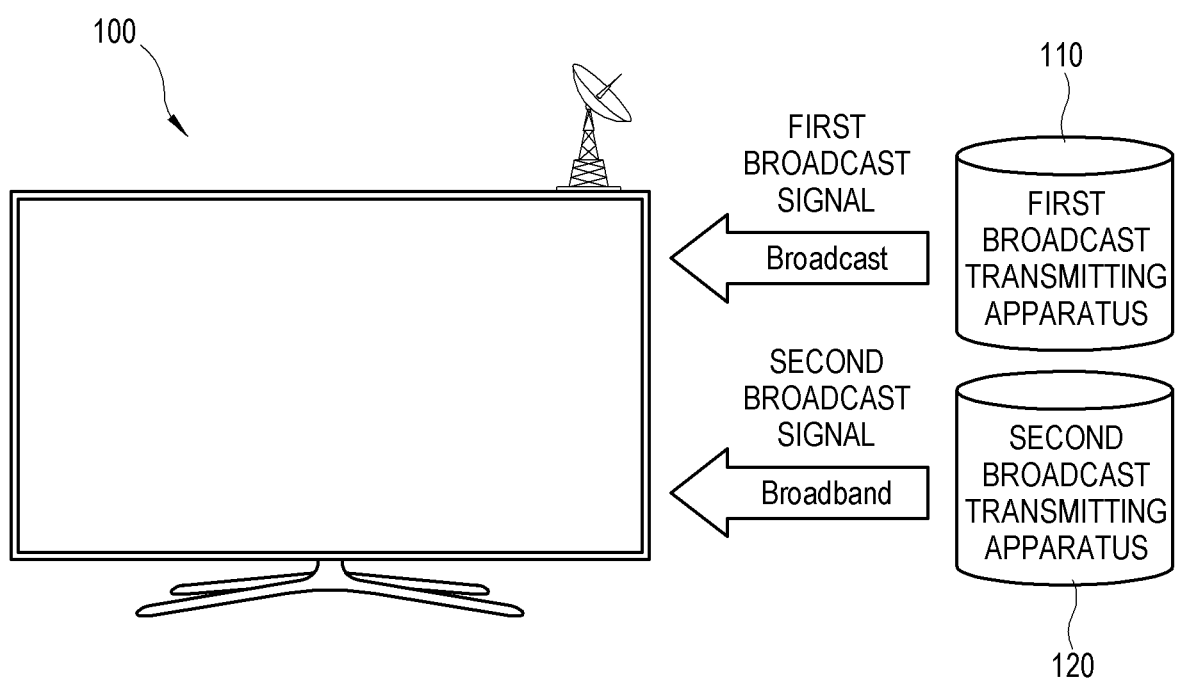
FIG. 1 illustrates a broadcast receiving apparatus according to an embodiment.

FIG. 1 illustrates a broadcast receiving apparatus according to an embodiment.

As shown in FIG. 1, a broadcast receiving apparatus 100 according to this embodiment includes a television (TV) that receives a broadcast signal and displays an image of a predetermined broadcast service in the broadcast signal. However, the TV is not the implementation for materializing the broadcast receiving apparatus 100, in which concept of the disclosure is reflected, and the broadcast receiving apparatus 100 is not limited to an apparatus capable of displaying an image. The broadcast receiving apparatus 100 may be materialized by any apparatus such as an image processing apparatus and a display apparatus, which are capable of processing a broadcast signal, for example, one among various apparatuses such as a set-top box, a computer monitor, a portable multimedia device, a smartphone, a tablet computer, a mobile phone, a computer, an electronic frame, a digital signage, a wearable device, etc.

The broadcast receiving apparatus 100 may receive a first broadcast signal from a first broadcast transmitting apparatus 110 in a broadcast mode, and/or receive a second broadcast signal from a second broadcast transmitting apparatus 120 in a broadband mode. The first broadcast transmitting apparatus 110 includes a terrestrial transmitter for a certain broadcasting station, and the second broadcast transmitting apparatus 120 includes a network server connected to the Internet. Although there is a difference between the broadcast mode and the broadband mode, the first broadcast transmitting apparatus 110 and the second broadcast transmitting apparatus 120 according to this embodiment transmit a broadcast signal according to the ATSC 3.0 standard.

When a broadcast signal is received from the first broadcast transmitting apparatus 110 and a user selects a channel corresponding to a certain broadcast service, the broadcast receiving apparatus 100 acquires signaling information or tuning information of the corresponding broadcast service from a previously stored service map or channel map. The broadcast receiving apparatus 100 is tuned to a broadcast signal through a tuner on the basis of the acquired signaling information, and thus displays an image of a broadcast service desired by a user. When the service map has not been previously stored in the broadcast receiving apparatus 100 for a certain reason, like a case that a user purchases and installs a new broadcast receiving apparatus 100, the broadcast receiving apparatus 100 acquires signaling information about a plurality of broadcast services from a broadcast signal by applying full auto-scanning in units of frequency to the broadcast signal, and generates and stores a service map including the acquired signaling information. The broadcast receiving apparatus 100 minimizes system load and time delay by referring the previously stored service map when the broadcast service is switched.

Meanwhile, after the broadcast receiving apparatus 100 generates and stores the service map, service configuration in a broadcast signal may be changed by a broadcast service provider that administers the first broadcast transmitting apparatus 110. For example, the broadcast service provider may periodically or as necessary add, delete and change a broadcast service, and may modify a channel number corresponding to the broadcast service. In this case, the service configuration in the broadcast signal is different from that at a previous point in time and stored in the broadcast receiving apparatus 100. Thus, if the broadcast receiving apparatus 100 is tuned to a broadcast signal on the basis of the previously stored service map, the signaling information of the service map may not match with that of the broadcast signal received at a current point in time. Therefore, the broadcast receiving apparatus 100 is not normally tuned to the broadcast signal and cannot provide a broadcast service desired by a user.

Thus, the broadcast receiving apparatus 100 according to an embodiment determines whether the signaling information included in the currently received broadcast signal has been changed. When it is determined that the signaling information included in the broadcast signal has been changed, the auto-scanning is performed again with regard to the broadcast signal, thereby acquiring new signaling information from the broadcast signal and updating the service map with the acquired signaling information. Thus, the broadcast receiving apparatus 100 can normally provide a broadcast service to a user even though the service configuration of the broadcast signal is changed by the broadcast service provider without advance notice.

Here, the auto-scanning for the broadcast signal may be performed with regard to only frequencies, at which a mismatch with the signaling information of the service map is determined, among the frequencies to which the tuner is being currently tuned, i.e. among all the frequencies of the broadcast signal, rather than all the frequencies of the broadcast signal.

Below, internal elements of a broadcast receiving apparatus will be described.

Figure 2:
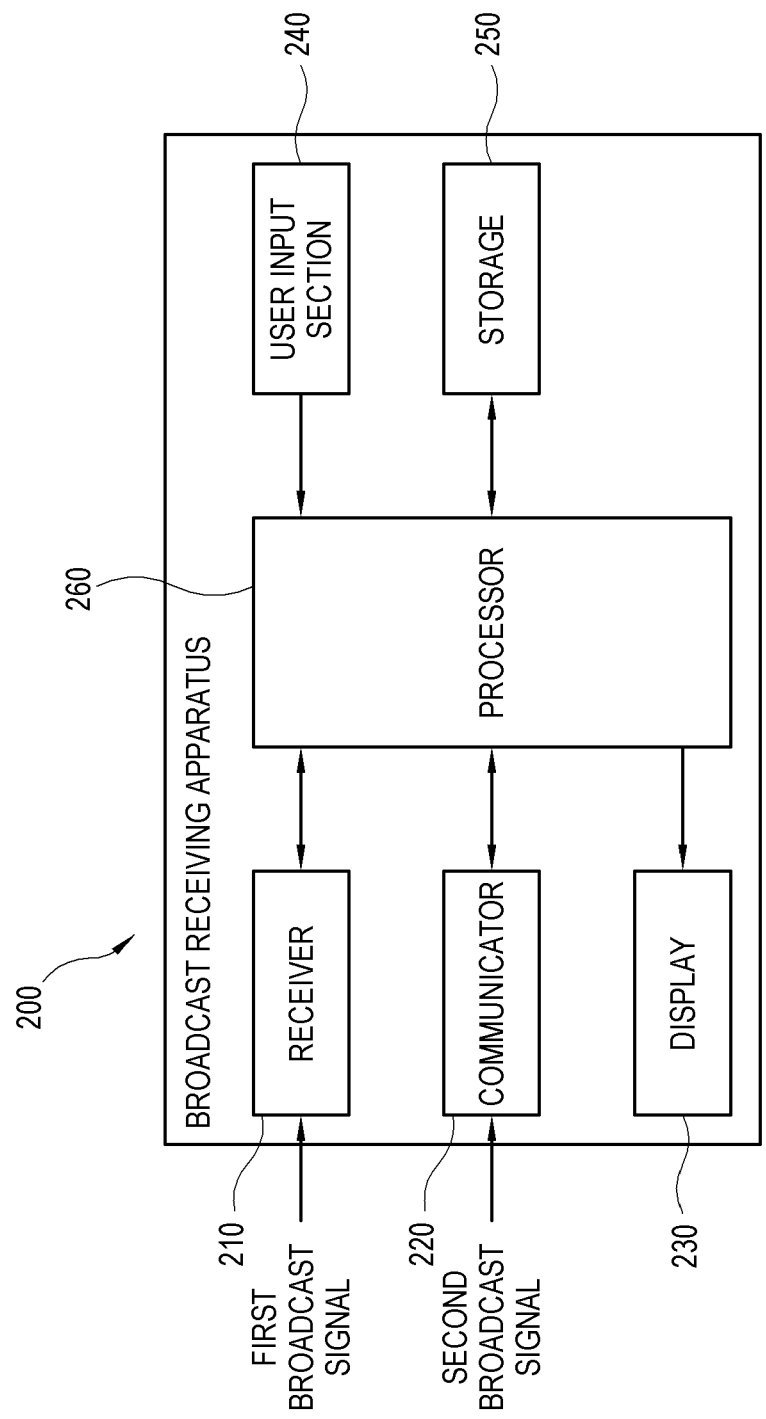
FIG. 2 is a block diagram of a broadcast receiving apparatus according to an embodiment.

FIG. 2 is a block diagram of a broadcast receiving apparatus according to an embodiment.

As shown in FIG. 2, a broadcast receiving apparatus 200 includes a receiver 210 for receiving a first broadcast signal, a communicator 220 for receiving a second broadcast signal, a display 230 for displaying an image of a broadcast service, a user input section 240 for receiving a user input, a storage 250 for storing data, and a processor 260 for controlling operations of the broadcast receiving apparatus 200 processing the first or second broadcast signal to be displayed as the image of the broadcast service.

In this embodiment, the broadcast receiving apparatus 200 is embodied by a display apparatus. Alternatively, the broadcast receiving apparatus 200 may be embodied by an image processing apparatus without the display 230.

The receiver 210 includes an antenna or circuit for receiving the first broadcast signal from a transmitter of the broadcasting station in the broadcast mode, and a tuner for being tuned to the first broadcast signal. The receiver 210 is tuned to a selected frequency for the first broadcast signal, and transmits the first broadcast signal to the processor 260.

The communicator 220 refers to a communication circuit including a data input/output interface, where communication modules, ports, etc. are combined corresponding to various communication protocols to receive the second broadcast signal from a network server in the broadband mode. The communicator 220 is provided to receive the second broadcast signal from the server, but may be interactively provided to transmit and receive a signal. The communicator 220 has an access to the server through various wired or wireless networks such as a local area network (LAN), wireless fidelity (Wi-Fi), etc.

The display 230 includes a display panel capable of displaying an image on a screen. The display panel may have a structure depending on received light like a liquid crystal display (LCD), or a structure capable of autonomously emitting light like an organic light emitting diode (OLED). The display 230 may include additional elements according to the structures of the display panel. For example, the display panel materialized by the LCD may additionally include a backlight unit for illuminating the LCD panel, a panel driving board for driving liquid crystal of the LCD panel, etc.

The user input section 240 transmits a preset control command or information to the processor 260 in response to a user's control or input. The user input section 240 may be materialized in various forms according to input modes of information. For example, the user input section 240 includes a key or hardware switch or button placed on an external side of the broadcast receiving apparatus 200, a touch screen placed on the display 230, a camera and a sensor for capturing or sensing a user's gesture, or various similar user interface environments provided in the broadcast receiving apparatus 200. In addition, the user input section 240 may include a remote controller physically separated from the broadcast receiving apparatus 200 and an interface, such as an infrared interface, for receiving signals from the remote controller.

The storage 250 is memory accessed by the processor 260, and provides for data reading, recording, modifying, deleting, updating and the like under control of the processor 260. The storage 250 may include a flash memory, a hard disk drive, a solid state drive (SSD), and the like nonvolatile memory capable of retaining data regardless of whether the broadcast receiving apparatus 200 is powered on or off; and a buffer, a random access memory (RAM) and the like to which data to be processed is loaded.

The processor 260 processes the first broadcast signal or the second broadcast signal so that an image of a broadcast service can be displayed on the display 230. The processor 260 parses and/or extracts various pieces of information for broadcast services from the tuned broadcast signal, and decodes image data and outputs the decoded image data to the display 230 in accordance with the extracted information and formatted and transmitted according to one or more standards among which the broadcast receiving apparatus 200 is capable of processing, such as the ATSC 3.0 standard. The processor 260 includes a hardware processor embodied by a central processing unit (CPU), a chipset, a buffer, a circuit, etc., which are mounted on a printed circuit board, and may be embodied by a system on chip (SoC). The processor 260 may include other circuitry such as a demultiplexer, a decoder, a scaler, an audio digital signal processor (DSP), an amplifier, and the like modules corresponding to various processes, some of which may be materialized as the SoC. For example, the demultiplexer, the decoder, the scaler and the like modules related to video processing may be materialized as a video processing SoC, and the audio DSP may be materialized as a chipset separated from the SoC.

In particular, the processor 260 according to an embodiment fulfils many operations of the broadcast receiving apparatus 200 according to the disclosure. The operations of the processor 260 will be set forth herein through the following-embodiments.

Below, a method of controlling a broadcast receiving apparatus will be described according to an embodiment.

Figure 3:
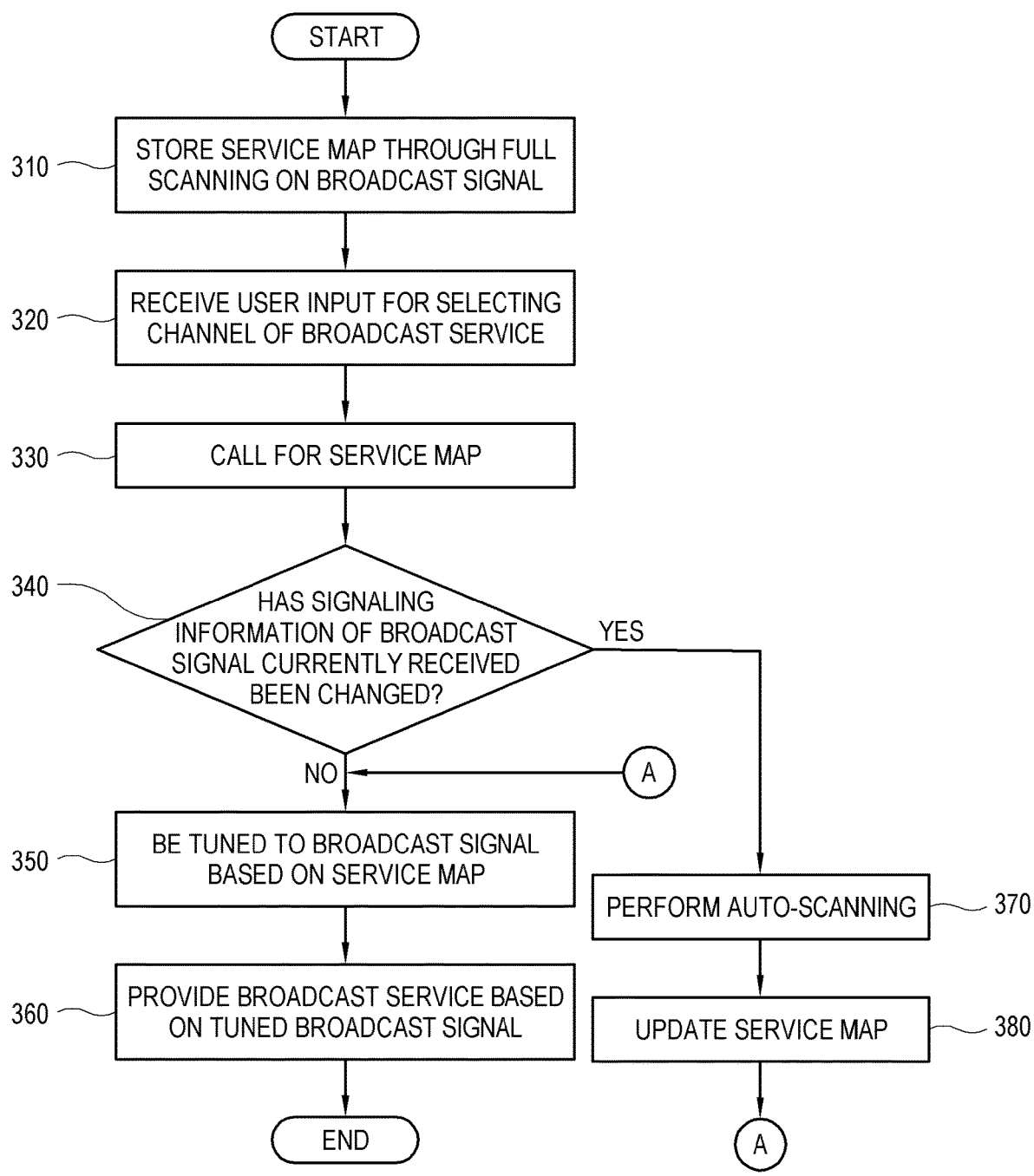
FIG. 3 is a flowchart of a method of controlling a broadcast receiving apparatus according to an embodiment.

FIG. 3 is a flowchart of a method of controlling a broadcast receiving apparatus according to an embodiment.

The method of controlling the broadcast receiving apparatus is performed under control of the processor executing computer-readable instructions read from the storage memory.

At operation 310 the broadcast receiving apparatus performs full auto-scanning on a received broadcast signal, and stores a service map generated according to scanning results. This operation is performed when the service map has not been previously stored in the broadcast receiving apparatus, for example, when the broadcast receiving apparatus is initially set. Alternatively, this operation may be performed when the service map has not been updated for a predetermined period of time, such that the service map may be unreliable with respect to a current broadcasting schedule of a broadcast provider.

At operation 320 the broadcast receiving apparatus receives a user input of selecting a channel for a certain broadcast service. One unit frequency of the broadcast signal is assigned to one physical channel, and one physical channel includes at least one virtual channel respectively corresponding to at least one broadcast service.

At operation 330 the broadcast receiving apparatus calls for the service map of the previously stored channel. The service map includes various pieces of information for receiving a broadcast signal of a corresponding channel, such as the frequency of the channel, the broadcast service ID, the signaling information, etc.

At operation 340 the broadcast receiving apparatus determines whether the signaling information of the currently received broadcast signal has been changed. To determine whether the signaling information has been changed, the broadcast receiving apparatus may for example determine whether the called service map matches with the broadcast signal currently received. In other words, when the service map does not match with the broadcast signal currently received, the broadcast receiving apparatus determines that the signaling information of the broadcast signal has changed. The broadcast receiving apparatus determines whether data of a broadcast service corresponding to the channel is correctly obtained from the received broadcast signal based on the information contained in the previously stored service map. Descriptions of determining that the service map does not match with the broadcast will be discussed below.

When it is determined that the signaling information of the broadcast signal received at the current point in time has not been changed (operation 340—NO), at operation 350 the broadcast receiving apparatus is tuned to the broadcast signal based on the information of the previously stored service map.

At operation 360 the broadcast receiving apparatus provides a broadcast service based on the tuned broadcast signal.

Meanwhile, when it is determined that the signaling information of the broadcast signal received at the current point in time has been changed (operation 340—YES), at operation 370 the broadcast receiving apparatus performs auto-scanning with regard to the corresponding frequencies. In this operation, not all frequencies of the broadcast signal may be scanned, but a frequency of a channel selected by a user may be subjected to the determination. Therefore, the broadcast receiving apparatus performs scanning on only partial frequencies rather than full scanning on all the frequencies of the broadcast signal. Of course, the full scanning may be performed on all the frequencies of the broadcast signal.

At operation 380 the broadcast receiving apparatus updates the service map with scanning results, and returns to the operation 350, thereby providing the broadcast service selected by a user. The broadcast receiving apparatus updates the previously stored service map with the signaling information derived from scanning the broadcast signal.

Thus, when the broadcast receiving apparatus senses that the broadcast service configuration of the broadcast signal has changed, the service map is updated corresponding to the changed broadcast signal, thereby normally providing the broadcast service to a user.

As described above, the broadcast receiving apparatus according to this embodiment operates according to the ATSC 3.0 standard. Below, a specific embodiment of the present disclosure will be described with operations under the ATSC 3.0 standard.

In the foregoing embodiment, the operations 350 and 360 are performed after the determination in the operation 340 or the update in the operation 380. Alternatively, operations 350 and 360 may be skipped. Further, the broadcast receiving apparatus may select a specific channel without a user input for selecting a channel in the operation 320. For example, when the broadcast receiving apparatus is in a standby mode or provides a service without using the tuner, the broadcast receiving apparatus may implement the foregoing process in the background with regard to a predetermined channel. In this case, when it is determined that the signaling information of the broadcast signal has changed, the broadcast receiving apparatus implements the process up to the operation of updating the service map, and does not implement the tuning operation such as the operations 350 and 360 of the foregoing embodiment.

Figure 4:
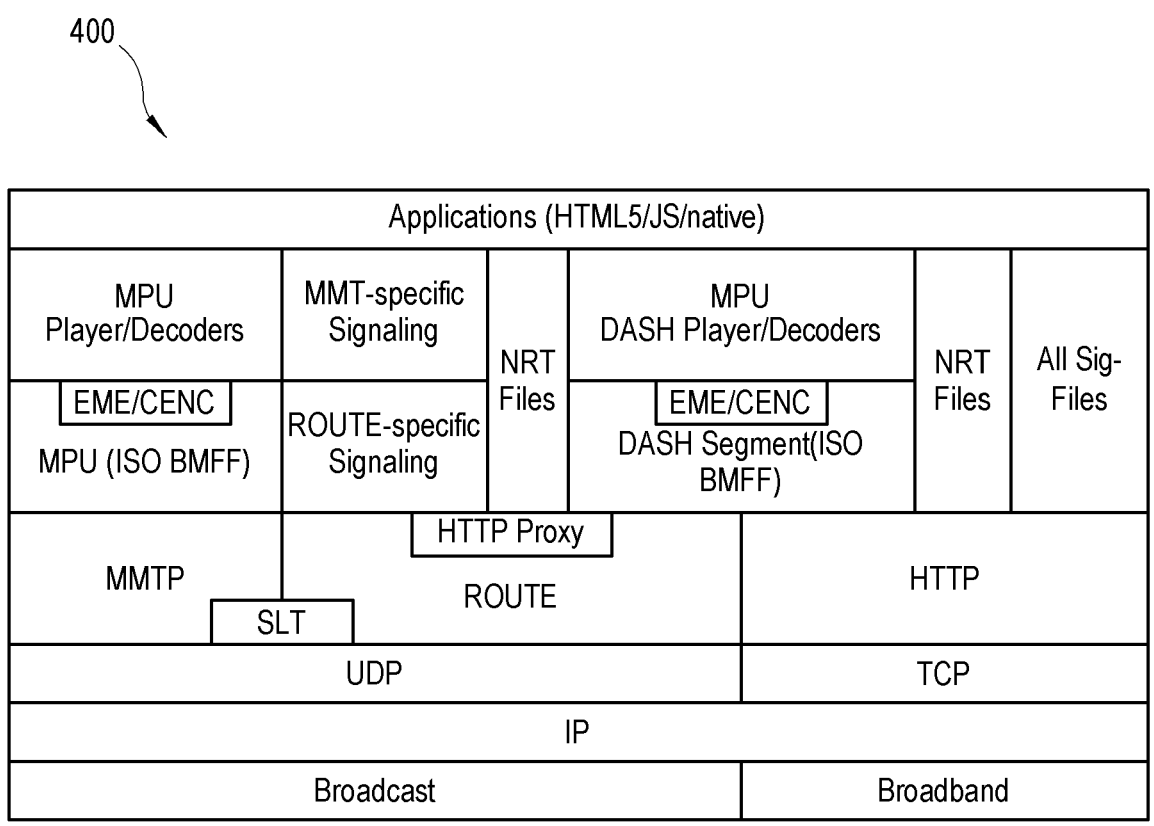
FIG. 4 is a block diagram of a protocol stack for the ATSC 3.0 standard referenced by a broadcast receiving apparatus according to an embodiment.

FIG. 4 is a block diagram of a protocol stack for the ATSC 3.0 standard referenced by a broadcast receiving apparatus according to an embodiment.

As shown in FIG. 4, a protocol stack 400 for the ATSC 3.0 standard shows protocols according to layers. In the ATSC 3.0 standard, a broadcast signal is transmitted by media in two modes of broadcast and broadband. The broadcast signal in the broadcast mode may be transmitted via a terrestrial path using the MPEG media transport protocol (MMTP) or a real time object delivery over unidirectional transport (ROUTE) protocol. In the MMTP, a media processing units (MPU) are transmitted using the MMTP based on an MPEG media transport (MMT). In the ROUTE protocol, a dynamic adaptive streaming over HTTP (DASH) segment is transmitted using the ROUTE based on MPEG DASH. Content to be transmitted using the MMTP or ROUTE may be given in real time or non-real time (NRT). The content may be reproduced by an MPU Player or a DASH Player.

A broadcast signal of the broadband mode is transmitted through the Internet according to HyperText Transfer Protocol (HTTP). In this case, information such as the DASH segment, the signaling information, the NRT, etc. is transmitted through HTTP. This information is transmitted as encapsulated in a link layer via transmission control protocol (TCP) and IP layers, and subjected to a process for transmission in a physical layer.

Signaling of the ATSC 3.0 standard is classified into low-level signaling (LLS) of transmission using a preset IP address and a UDP port, and service layer signaling (SLS) of transmission using the MMTP or ROUTE protocol. Information for acquiring the SLS is provided through a service list table (SLT) as a kind of LLS, and the SLS offers information about how the physical layer and the transport layer are transmitted in the SLT according to the transmission protocol of the broadcast service. The processor of the broadcast receiving apparatus acquires the SLT and the SLS from the broadcast signal, and thus obtains signaling information of the broadcast service.

The SLT includes information needed for specifying and receiving a broadcast service in the broadcast signal. The processor of the broadcast receiving apparatus uses the SLT to generate a service map including information about a plurality of broadcast services receivable in the broadcast receiving apparatus, when auto-scanning is performed on all the frequencies or some frequencies of the broadcast signal. The SLT may be encapsulated via the UDP and IP layers.

Below, a process of acquiring necessary information from a broadcast signal by the broadcast receiving apparatus to generate a service map will be described.

Figure 5:
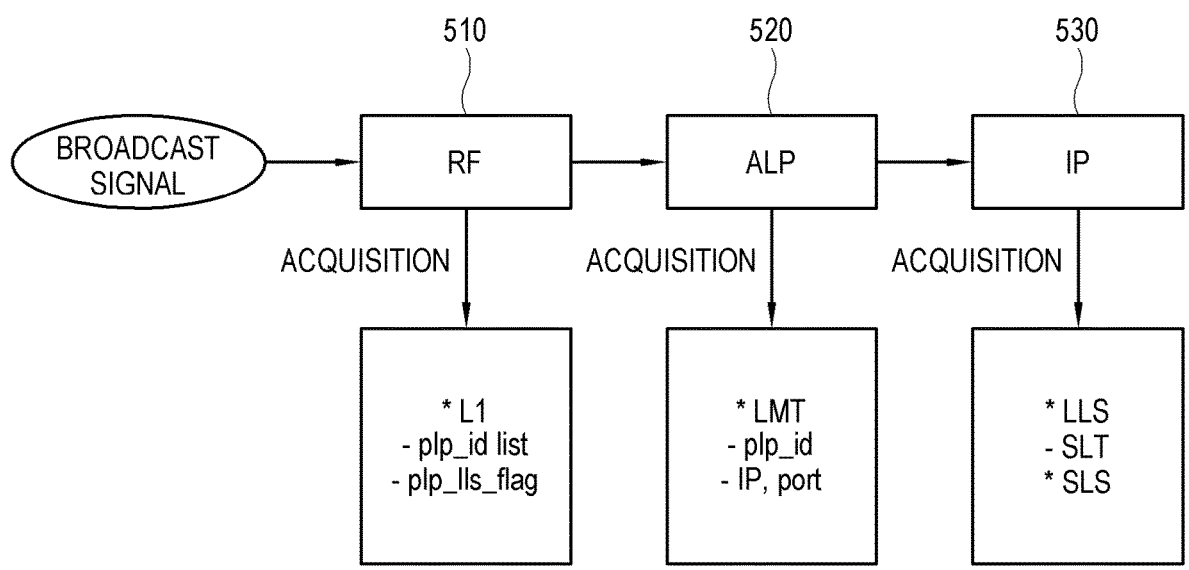
FIG. 5 illustrates a method of extracting information from a broadcast signal by a broadcast receiving apparatus according to an embodiment.

FIG. 5 illustrates a method of extracting information from a broadcast signal by a broadcast receiving apparatus according to an embodiment.

As shown in FIG. 5, the broadcast receiving apparatus receives a broadcast signal and is tuned to a specific frequency; the broadcast signal is subjected to a radio frequency (RF) operation 510, an ATSC link layer protocol (ALP) operation 520, and an IP operation 530. In the procedure of processing the broadcast signal as shown in the protocol stack described above, some operations are present even after the IP operation 530. The broadcast receiving apparatus includes information that can be derived from each operation for the broadcast signal, and ultimately provides a broadcast service based on the information.

The broadcast signal includes one or more physical layer pipe (PLP) according to frequencies. When a physical layer of a unit frequency is regarded as one frame, the PLP corresponds to a sub frame in this frame. Alternatively, the PLP may be regarded as a kind of transmission pipe line or transmission path for transmitting data of the broadcast service. As a specific port and IP address are assigned to the PLP, a specific broadcast service is received in the broadcast receiving apparatus through the PLP. One PLP is not always used for transmitting only one broadcast service. Alternatively, one PLP may be used for transmitting a plurality of broadcast services, or a plurality of PLPs may be used for transmitting one broadcast service. In the ATSC 3.0 standards, the physical layer is configured to support a maximum of 64 PLPs.

In the RF operation 510, the broadcast receiving apparatus acquires data of 'L1' signaling from the broadcast signal. The data of 'L1' signaling includes 'plp_id list' indicating a list of ID of PLP included in the broadcast signal, and 'plp_11s_flag' indicating which PLP the SLT is included in among all the PLPs. That is, through the data of 'L1' signaling, the broadcast receiving apparatus can be informed of the quantity of PLPs included in a certain frequency of the broadcast signal, an ID of each PLP included in the corresponding frequency, a flag indicating which ID the PLP including the SLT has among the PLPs, etc. For example, when the PLP has 'plp_id' of '[plp_11s_flag=true]', it is indicated that the PLP includes the SLT. On the other hand, when the PLP has 'plp_id' of '[plp_11s_flag=false]', it is indicated that the PLP does not include the SLT.

In the ALP operation 520, the broadcast receiving apparatus acquires a link mapping table (LMT) from the broadcast signal. To enable the broadcast receiving apparatus to receive the broadcast service through a predetermined PLP, a specific port and an IP address may be assigned to the corresponding PLP. Such an assigning operation is called port mapping. The LMT is storing information necessary for the port mapping, which includes the ID of the PLP, and information about an IP address and a port number assigned to the ID of the PLP.

In the IP operation 530, the broadcast receiving apparatus acquires the LLS and the SLS from the broadcast signal. Since the LLS includes the SLT, the broadcast receiving apparatus can acquire the SLT in the IP operation 530. Regarding the LLS, the SLS and the SLT, they are the same as described in the foregoing embodiment.

When receiving the broadcast signal, the broadcast receiving apparatus acquires a list of IDs of the PLPs in the broadcast signal and determines the ID of the PLP, which includes the SLT, among all the PLPs, on the basis of the data of 'L1' signaling acquired in the RF operation 510. Next, the broadcast receiving apparatus assigns the IP and port to each PLP on the basis of the LMT acquired in the ALP operation 520, thereby enabling reception of the broadcast service through the PLP. Next, the broadcast receiving apparatus establishes a service map based on the SLT acquired in the IP operation 530. The broadcast receiving apparatus acquires the SLT from the PLP indicated by the data of 'L1' signaling previously acquired in the RF operation 510.

Below, the method of obtaining data of a broadcast service corresponding to a channel selected by a user from a broadcast signal on the basis of signaling information such as an SLT, an LMT, etc. will be described.

Figure 6:
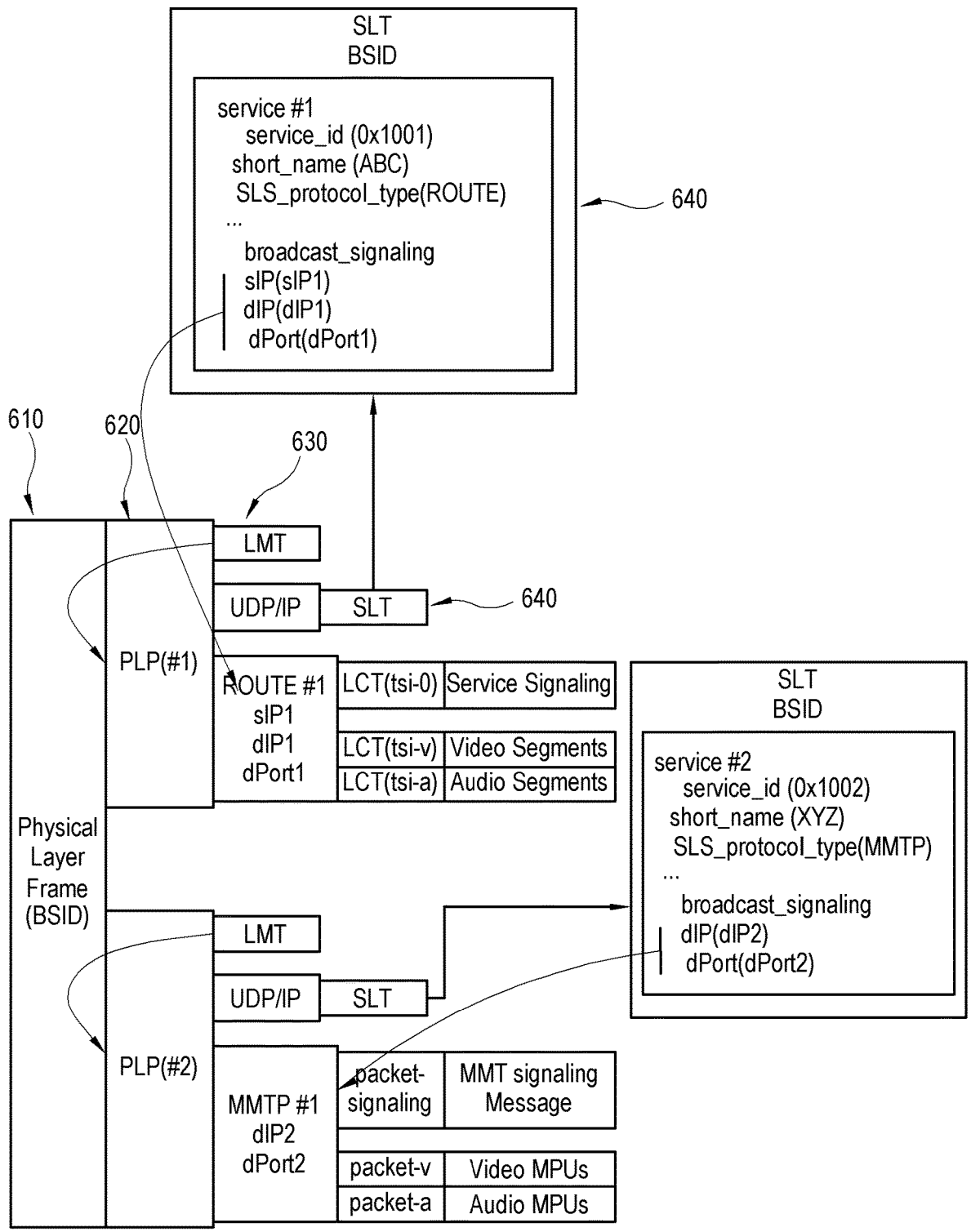
FIG. 6 is a block diagram of deriving a broadcast service on the basis of signaling information by a broadcast receiving apparatus according to an embodiment.

FIG. 6 is a block diagram of deriving a broadcast service on the basis of signaling information by a broadcast receiving apparatus according to an embodiment.

As shown in FIG. 6, a physical layer 610 at a certain frequency of a broadcast signal includes a plurality of PLPs 620. The broadcast receiving apparatus identifies a plurality of PLPs 620 in the physical layer 610 on the basis of 'L1' signaling, and assigns an IP address and a port based on an LMT 630.

The LMT 630 and the SLT 640 may be included in the same PLP 620 as that of the broadcast service, or may be included in the PLP 620 different from the PLP 620 of the broadcast service. Further, a plurality of SLTs 640 respectively describing different broadcast services in one frequency may be present in the plurality of PLPs 620.

When receiving the SLT 640 from the PLP 620 indicated by the flag information of 'L1' signaling, the broadcast receiving apparatus determines which broadcast service is provided through which PLP 620 on the basis of the information recorded in the SLT 640. For example, the broadcast receiving apparatus may determine content of the broadcast service received through the PLP 620 on the basis of the information from the SLT 640. On the basis of the SLT 640, the broadcast receiving apparatus may determine which broadcast service is received through the PLP 620, which one of the ROUTE protocol and the MMTP is used in transmitting the broadcast service, and whether the corresponding broadcast service includes video data, audio data or both the video and audio data.

In other words, the broadcast receiving apparatus generates the service map so as to be tuned to a selected channel of a broadcast signal on the basis of the signaling information such as the LMT 630, the SLT 640, etc.

Below, a form of the service map will be described.

Figure 7:
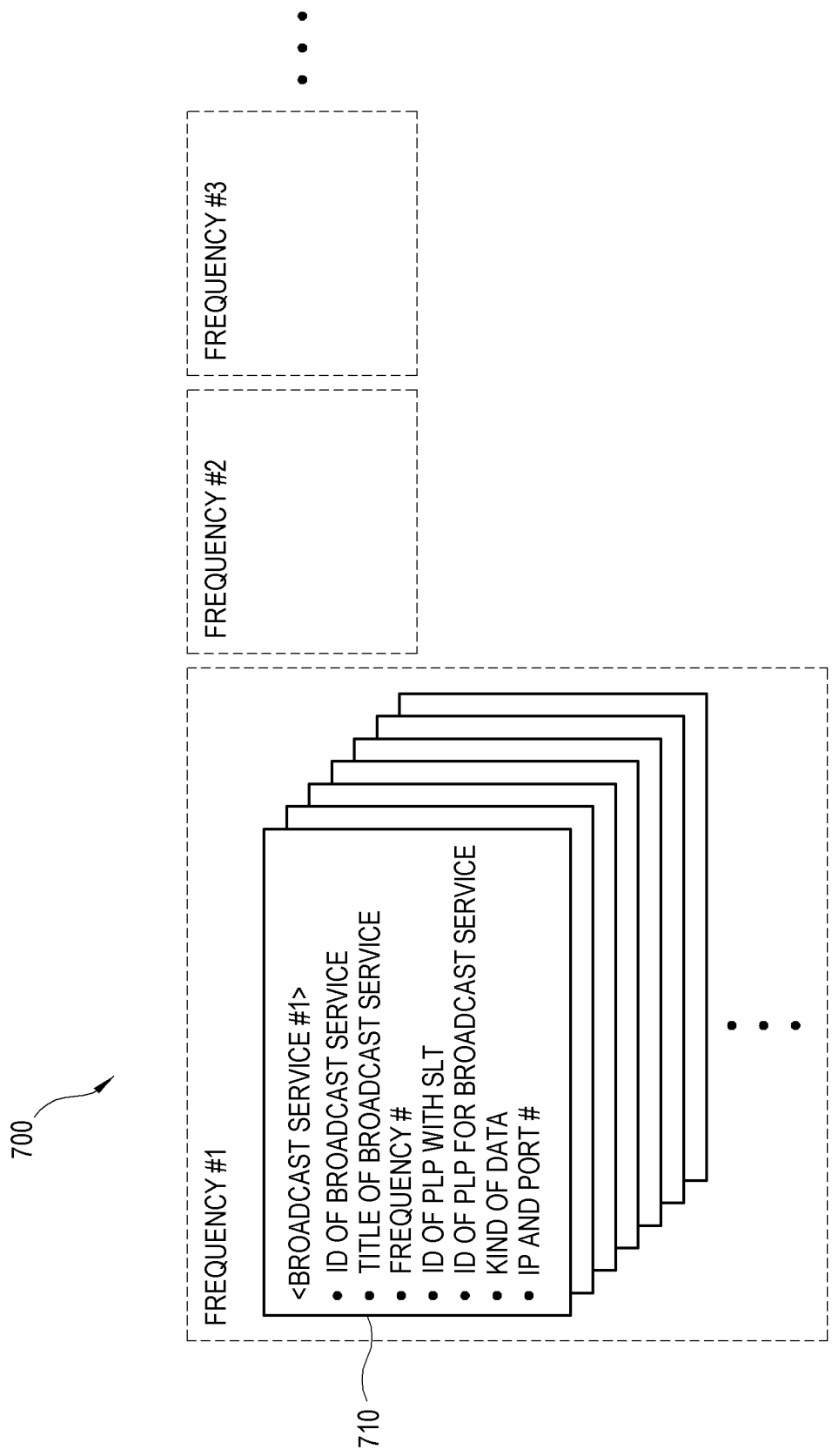
FIG. 7 illustrates an example of a service map to be referenced by a broadcast receiving apparatus according to an embodiment.

FIG. 7 illustrates an example of a service map to be referenced by a broadcast receiving apparatus according to an embodiment.

As shown in FIG. 7, the broadcast receiving apparatus may for example generate and store a service map 700 by applying auto-scanning to all valid frequencies of a broadcast signal in a setting process. Here, the valid frequency refers to a frequency within a band allowed to be used by the broadcast signal. The broadcast signal includes a frequency unit assigned according to broadcast service providers such as broadcasting stations, and one or more broadcast services involved in each frequency unit. The service map 700 is also formed by reflecting such a service configuration of the broadcast signal.

The service map 700 is formed in units of broadcast service information 710 corresponding to an individual broadcast service. The broadcast service information 710 refers to tuning information for a broadcast signal for providing a predetermined broadcast service, and includes signaling information about the broadcast signal of the channel corresponding to the broadcast service. As described above, the broadcast service information 710 is based on information acquired from the LMT, the SLT, etc. by the broadcast receiving apparatus.

Since a plurality of broadcast services are able to be provided at one unit frequency, a plurality of pieces of broadcast service information 710 may be involved in each frequency. In this embodiment, a predetermined frequency #1 in the service map 700 will be described. However, the same principles may be applied to other frequencies such as a frequency #2, a frequency #3, and so on.

The broadcast service information 710 corresponding to a certain broadcast service generally includes information as follows. The broadcast service information 710 includes the ID of the broadcast service, the title of the broadcast service, a frequency number or frequency ID of a channel through which the broadcast service is provided, ID of a PLP including an SLT corresponding to the broadcast service, the ID of the PLP for providing the broadcast service, the kind of data for the broadcast service, an IP and a port number of a necessary PLP, etc.

The signaling information of the broadcast service information 710, that is, the information such as the ID of the PLP including the SLT corresponding to the broadcast service, the ID of the PLP for providing the broadcast service, the IP and port number of the necessary PLP may be acquired from the SLT or LMT. When the broadcast receiving apparatus is tuned to a broadcast signal based on the previously stored service map 700, but the service configuration of the currently received broadcast signal is different from that of the service map 700, the broadcast receiving apparatus is not normally tuned to the broadcast signal corresponding to the selected broadcast service. Thus, the broadcast receiving apparatus detects a change in the service configuration of the broadcast signal. Below, an embodiment in which the broadcast receiving apparatus detects change in the service configuration of the broadcast signal based on the ATSC 3.0 standards will be described.

Figure 8:
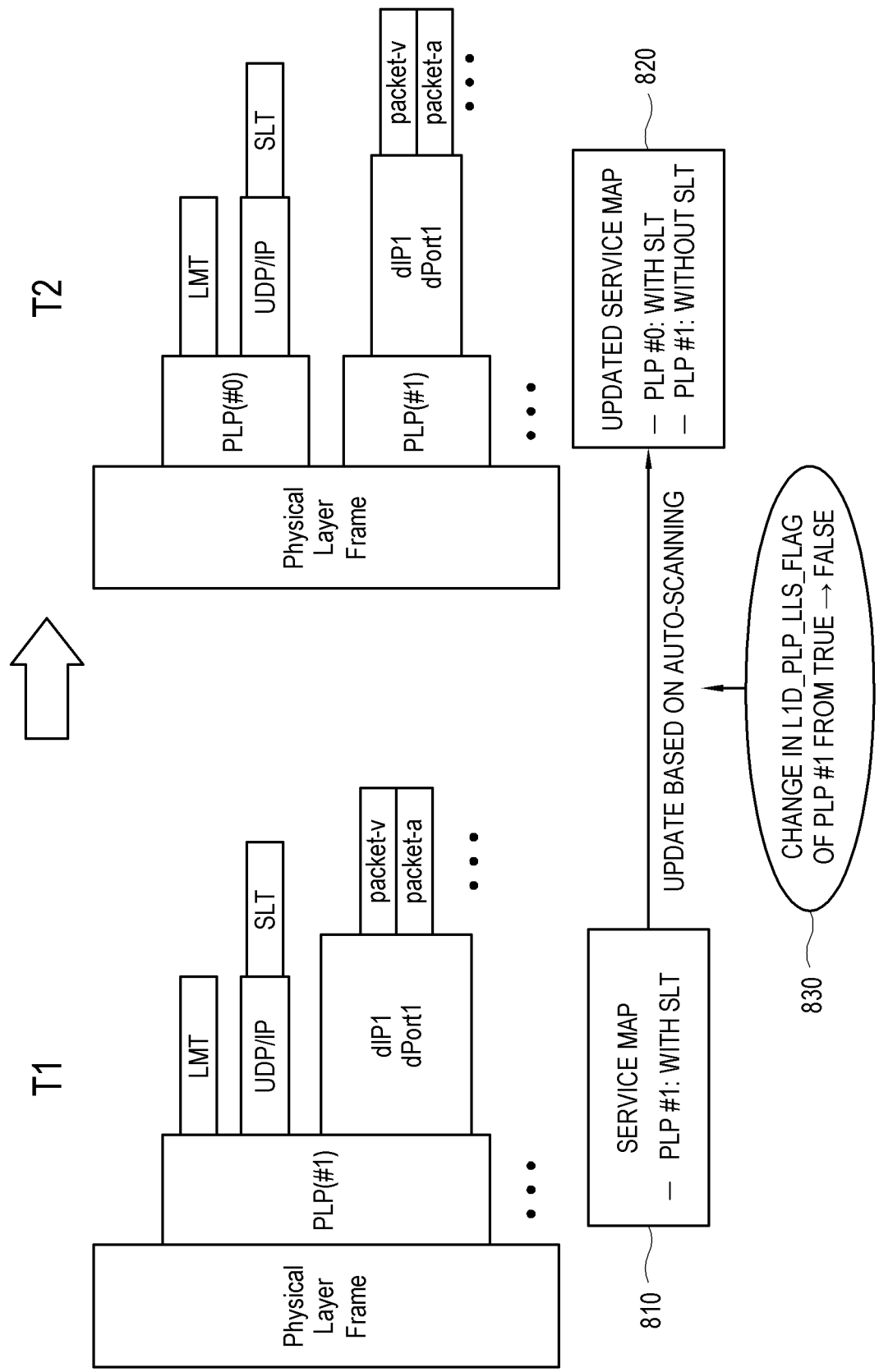
FIG. 8 illustrates a method of detecting change in a service configuration of a broadcast signal by a broadcast receiving apparatus according to an embodiment.

FIG. 8 illustrates a method of detecting change in a service configuration of a broadcast signal by a broadcast receiving apparatus according to an embodiment.

As shown in FIG. 8, the broadcast receiving apparatus generates and stores a service map 810, in which a service configuration state of a broadcast signal is reflected, by applying auto-scanning to a certain frequency for the broadcast signal at a point in time T1. For example, in a certain frequency physical layer at the point in time T1, signaling information including an LMT and an SLT, and content of the broadcast service are received through a PLP #1. It is recorded in the service map 810 that the SLT is included in the PLP #1. When there are no changes in the service configuration of the broadcast signal and a corresponding relationship is continuously established between the broadcast signal and the service map, the broadcast receiving apparatus is tuned to the broadcast signal on the basis of the service map 810, thereby normally providing the broadcast service.

On the other hand, the broadcast receiving apparatus monitors whether the PLP #1 of the broadcast signal has been changed to not include the SLT after the initial point in time T1. As a detailed monitoring method, the broadcast receiving apparatus determines whether 'plp_11s_flag' in the data of 'L1' acquired in the RF operation for the broadcast signal is changed in a value from 'true' to 'false'.

As described above, 'plp_11s_flag' in the data of 'L1' signaling, i.e. 'L1D_plp_11s_flag' refers to information for indicating whether a predetermined PLP includes an SLT. When this information is changed in a value from 'true' at the point in time T1 to 'false' at a point in time T2, it indicates that the service configuration of the broadcast signal at the point in time T2 does not match with that of the service map 810 at the point in time T1, and more specifically means that the PLP #1 does not include the SLT at the point in time T2. Therefore, the broadcast receiving apparatus cannot be normally tuned to the broadcast signal at the point in time T2 on the basis of a service map 820 generated and stored at the point in time T1.

The service configuration state of the broadcast signal at the point in time T2 shows that the PLP #1 includes only the content of the broadcast service without the signaling information, and the signaling information is included in a PLP #0. The broadcast service provider may arbitrarily and/or periodically change the configurations of the physical layer, the link layer, the IP layer, etc. of the broadcast signal for reasons of adding, deleting, changing, or etc. the broadcast service. For example, when the broadcast receiving apparatus changes the physical layer to exclude the signaling information from the PLP #1 a user is watching like that at the point in time T2 under a condition that only the PLP #1 is set in the service map 810, the broadcast receiving apparatus cannot receive the signaling information through the PLP #1 and be informed of change in the broadcast signal.

Thus, the broadcast receiving apparatus in this embodiment monitors whether 'L1D_plp_11s_flag' in the PLP #1 including the SLT is changed from 'true' to 'false' in the service map 810 after the point in time T1. When it is sensed that 'L1D_plp_11s_flag' in the PLP #1 is changed into 'false' (830), the broadcast receiving apparatus performs the auto-scanning on the physical layer of the corresponding frequency.

The broadcast receiving apparatus checks that the PLP #1 does not include the LMT and the SLT but the PLP #0 includes the LMT and the SLT through the auto-scanning, and updates the previously stored service map 810 with the auto-scanning results, thereby generating and storing the updated service map 820. The updated service map 820 corresponds to the broadcast signal at the point in time T2 because it reflects the auto-scanning results at the point in time T2.

Thus, the broadcast receiving apparatus in this embodiment easily detects the change in the service configuration of the broadcast signal, thereby updating the service map to incorporate the changed information. Below, a method of controlling the broadcast receiving apparatus according to this embodiment will be described.

Figure 9:
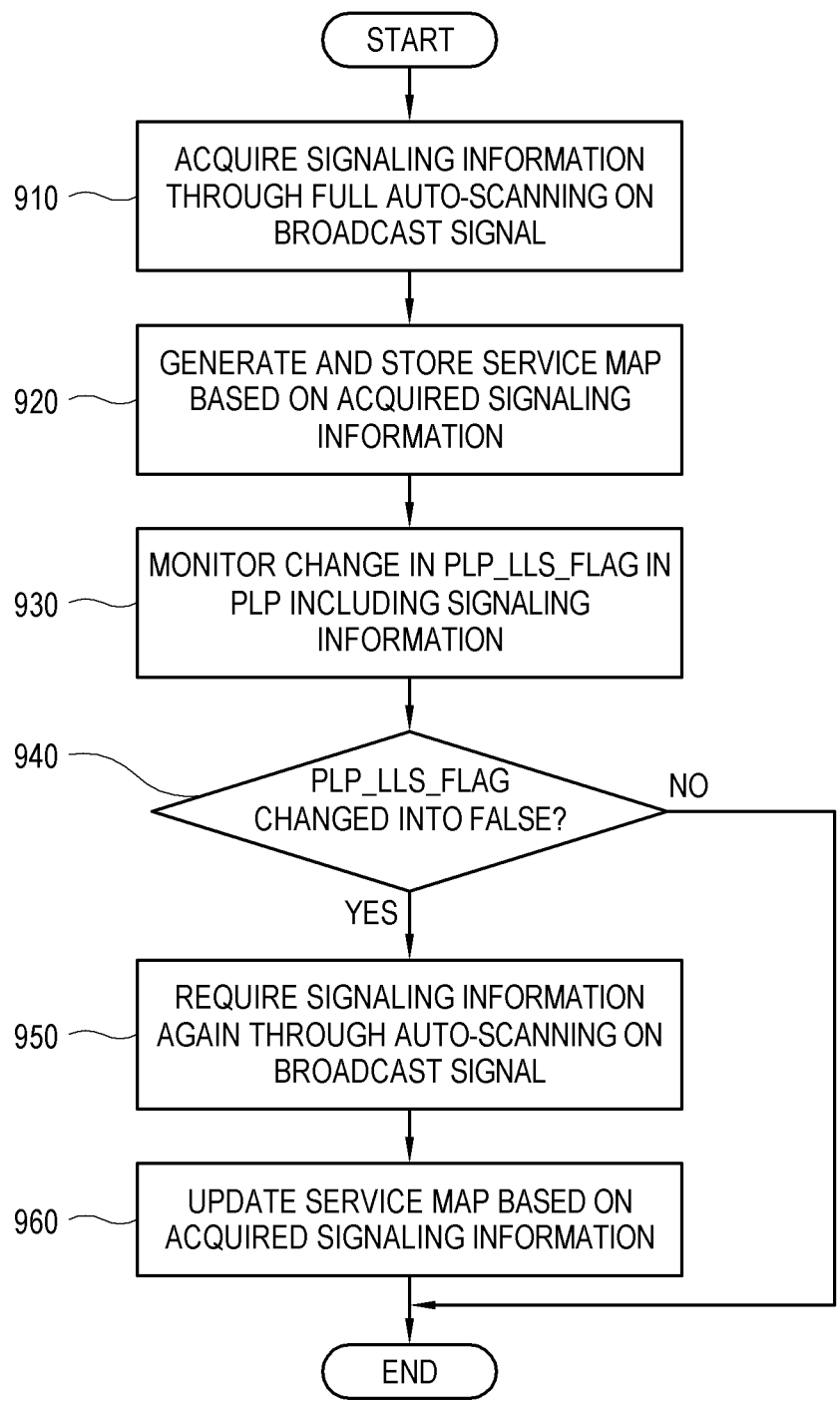
FIG. 9 is a flowchart of a method of processing a broadcast signal by a broadcast receiving apparatus according to an embodiment.

FIG. 9 is a flowchart of a method of processing a broadcast signal by a broadcast receiving apparatus according to an embodiment.

As shown in FIG. 9, at operation 910 the broadcast receiving apparatus acquires signaling information by performing full auto-scanning on a broadcast signal.

At operation 920 the broadcast receiving apparatus generates and stores a service map based on the acquired signaling information.

At operation 930 the broadcast receiving apparatus monitors change in 'plp_11s_flag' of a PLP including the signaling information.

At operation 940 the broadcast receiving apparatus determines whether a value of 'plp_11s_flag' of the PLP has been changed, for example from 'true' into 'false'.

When it is monitored that the value of 'plp_11s_flag' has been changed into 'false' (operation 940—YES), at operation 950 the broadcast receiving apparatus again acquires the signaling information by performing auto-scanning on the broadcast signal. Here, the auto-scanning is performed with regard to only the frequency of the broadcast signal which has changed in the value of 'plp_11s_flag'.

At operation 960, the broadcast receiving apparatus updates the service map based on the acquired signaling information.

On the other hand, when it is monitored that the value of 'plp_11s_flag' has not been changed into 'false' (operation 940—NO), the broadcast receiving apparatus retains the currently stored service map, and tunes to the broadcast signal based on the corresponding service map.

Thus, the broadcast receiving apparatus monitors the change in 'plp_11s_fla' of the PLP including the signaling information, and easily determines the change in the service configuration of the broadcast signal.

In the foregoing embodiment, as one of the methods of detecting the change in the service configuration of the broadcast signal based on the ATSC 3.0 standard by the broadcast receiving apparatus, the features of monitoring whether the value of 'plp_11s_flag' of the PLP including the signaling information is changed from 'true' to 'false' are described. However, the method is not limited by the features according to the foregoing embodiment. Below, embodiments based on other features will be described.

Figure 10:
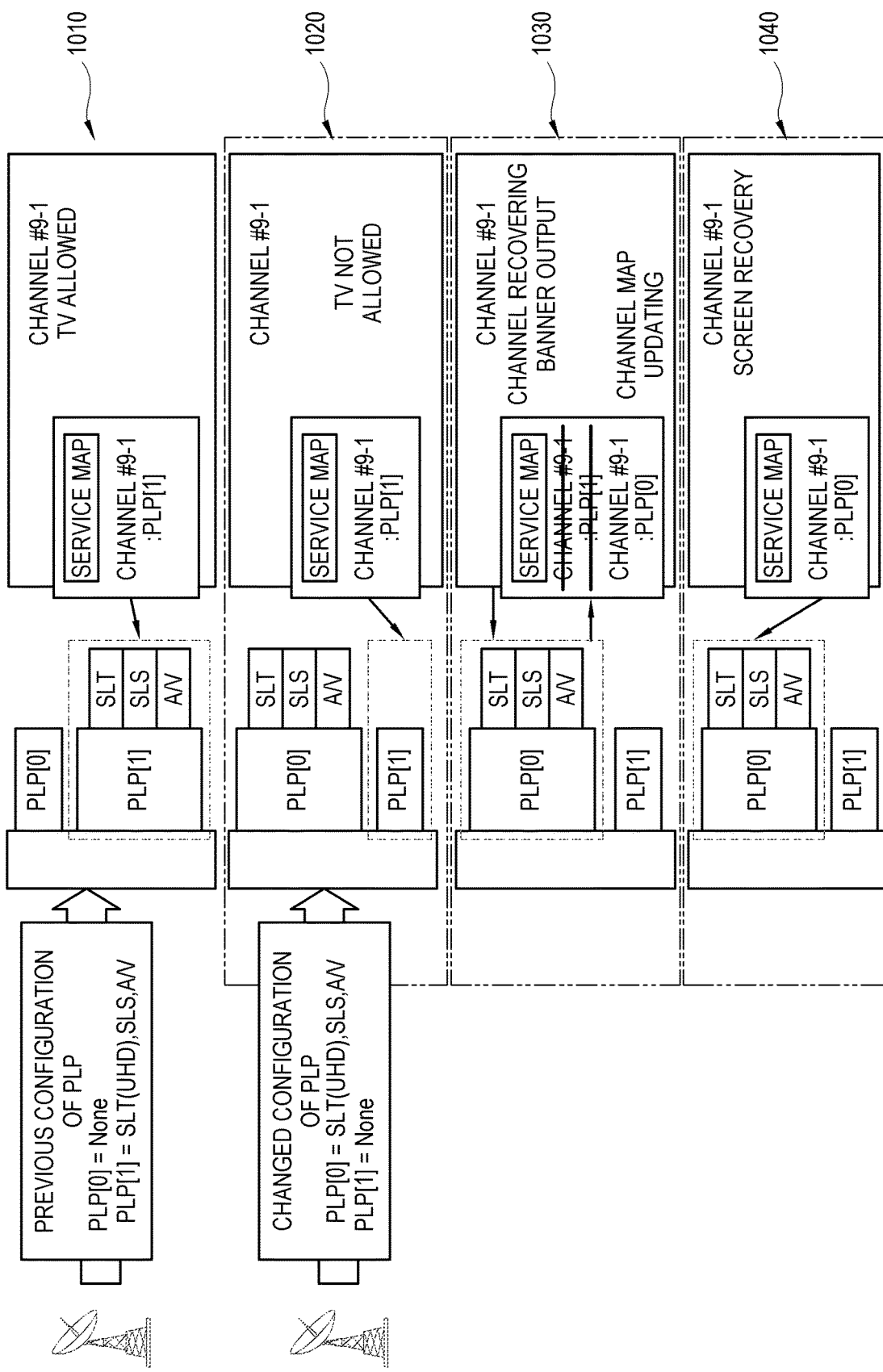
FIG. 10 illustrates a method of processing a broadcast signal by a broadcast receiving apparatus according to an embodiment.

FIG. 10 illustrates a method of processing a broadcast signal by a broadcast receiving apparatus according to an embodiment.

As shown in FIG. 10, it will be assumed that a user wants to view a channel of '9-1' among a plurality of channels while the broadcast receiving apparatus is receiving a broadcast signal (1010). The service configuration of the broadcast signal at this point in time does not provide a broadcast service through a PLP[0], but provides SLT, SLS, audio and video (A/V) data of a broadcast service corresponding to a channel of '9-1' through a PLP[1].

The previously stored service map includes information indicating that the SLT, SLS and A/V data of the channel of '9-1' is received through the PLP[1]. On the basis of the information of the service map, the broadcast receiving apparatus receives the broadcast service of the channel of '9-1' through the PLP[1], and normally displays an image of the broadcast service corresponding to the channel of '9-1'. In the operation 1010, the ID of the PLP including the signaling information of a predetermined broadcast service, which has been described in the service map, is the same as that of an actual service configuration of the broadcast signal, and therefore the broadcast receiving apparatus normally receives the LLS through the PLP of the corresponding ID. Here, the LLs may include the SLT, or may include information defined in the ATSC 3.0 standard.

The broadcast service provider may change the service configuration of the broadcast signal (1020). For example, the service configuration of the broadcast signal may be changed to provide the SLT, SLS, A/V data of the broadcast service corresponding to the channel of '9-1' through the PLP[0], and not to provide the broadcast service through the PLP[1]. In this case, the LLS is not received through the PLP[1] even though the broadcast receiving apparatus is tuned to the broadcast signal based on the previously stored service map. That is, in the operation 1020, the broadcast signal tuned by the tuner is not output, and therefore the image of the broadcast service corresponding to the channel of '9-1' is not displayed.

To prevent the image of the broadcast service from being not displayed as the broadcast signal tuned by the tuner is not output, the broadcast receiving apparatus operates as follows. The broadcast receiving apparatus opens a certain PLP of 'LD1_plp_11s_flag=true' among PLPs of a currently received broadcast signal and performs test tuning to be tuned to the broadcast signal (1030). When the LLS of the broadcast service corresponding to the channel of '9-1' is normally received through the opened PLP, the broadcast receiving apparatus reflects new tuning results in updating the service map with regard to the broadcast service corresponding to the channel of '9-1' (1040).

For example, when the PLP[0] of the broadcast signal shows 'LD1_plp_11s_flag=true', the broadcast receiving apparatus opens the PLP[0] and checks whether the LLS for the channel of '9-1' is received through the PLP[0]. When the LLS is normally received, the broadcast receiving apparatus modifies the service map with a description that the broadcast service corresponding to the channel of '9-1' is received through the PLP[0].

On the other hand, when the broadcast receiving apparatus is tuned to the broadcast signal by opening a certain PLP of 'LD1_plp_11s_flag=true' among PLPs of a currently received broadcast signal, but the LLS is not normally received from the opened PLP, the broadcast receiving apparatus attempts to be tuned to the broadcast signal by opening other PLPs of 'LD1_plp_11s_flag=true' in sequence until the LLS is normally received through the opened PLP. The PLPs may be opened in a preset order. For example, the broadcast receiving apparatus may sequentially select the PLPs, the ID of which is adjacent to that of the previous PLP, among the PLPs of 'LD1_plp_11s_flag=true'.

The broadcast receiving apparatus is tuned to the broadcast signal on the basis of the updated service map, and normally displays the image of the broadcast service corresponding to the channel of '9-1' through the PLP[0].

Although a service configuration of a broadcast signal is changed while displaying a predetermined broadcast service, the broadcast receiving apparatus according to this embodiment can normally display an image of the broadcast service by coping with the change.

Figure 11:
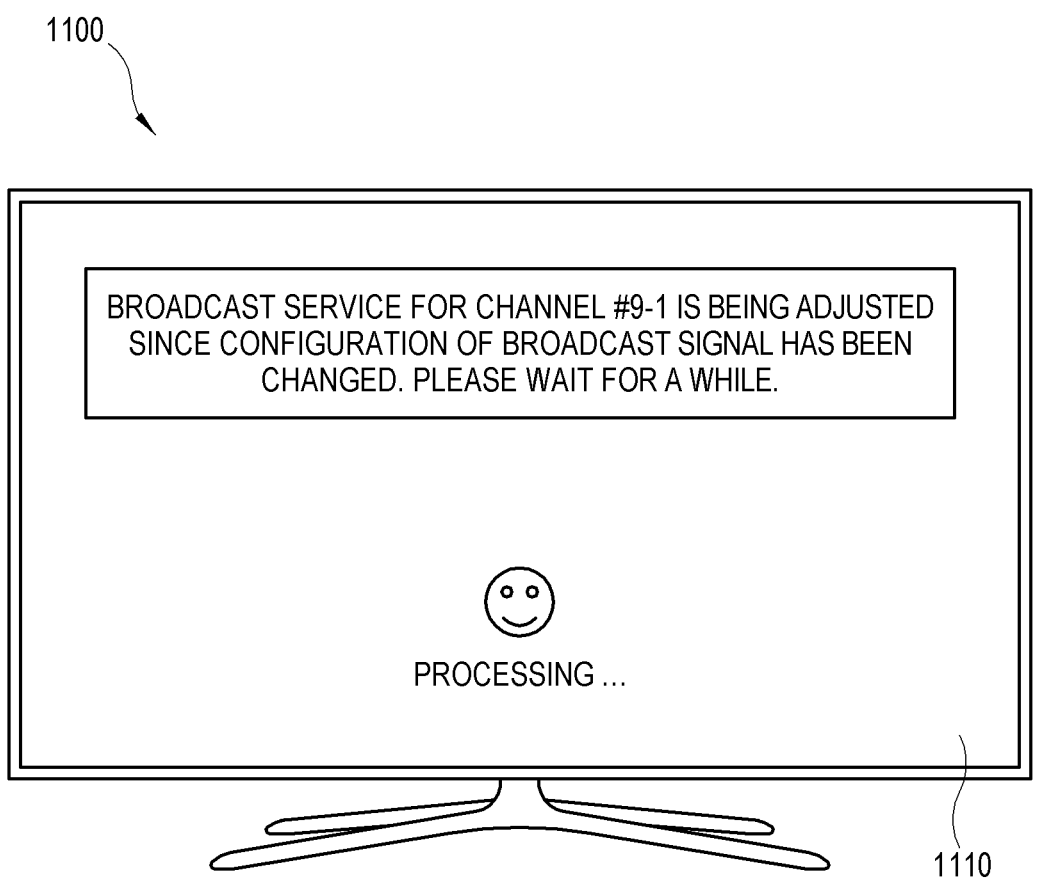
FIG. 11 illustrates a user interface (UI) displayed by a broadcast receiving apparatus during test tuning according to an embodiment.

FIG. 11 illustrates a user interface (UI) displayed by a broadcast receiving apparatus during test tuning according to an embodiment.

As shown in FIG. 11, a broadcast receiving apparatus 1100 displays on a screen a UI 1110 of a message notifying that a channel of a current broadcast service is being adjusted as a broadcast signal is changed. In the foregoing embodiment with reference to FIG. 10, when display of an image is delayed in the broadcast receiving apparatus 1100 during the operation 1030, a user may mistake such a delay a for failure of the broadcast receiving apparatus 1100. To prevent a user's misunderstanding, the broadcast receiving apparatus 1100 may display a banner or message notifying that the test tuning is being performed be displayed as the UI 1110 on the screen while the test tuning is being performed.

Thus, a user can be informed that the broadcast receiving apparatus 1100 is being currently adjusted even when a broadcast service is not provided as desired for reasons of the adjustment.

Below, operations of the broadcast receiving apparatus will be described when an image of a broadcast service changed by a user is not displayed.

Figure 12:
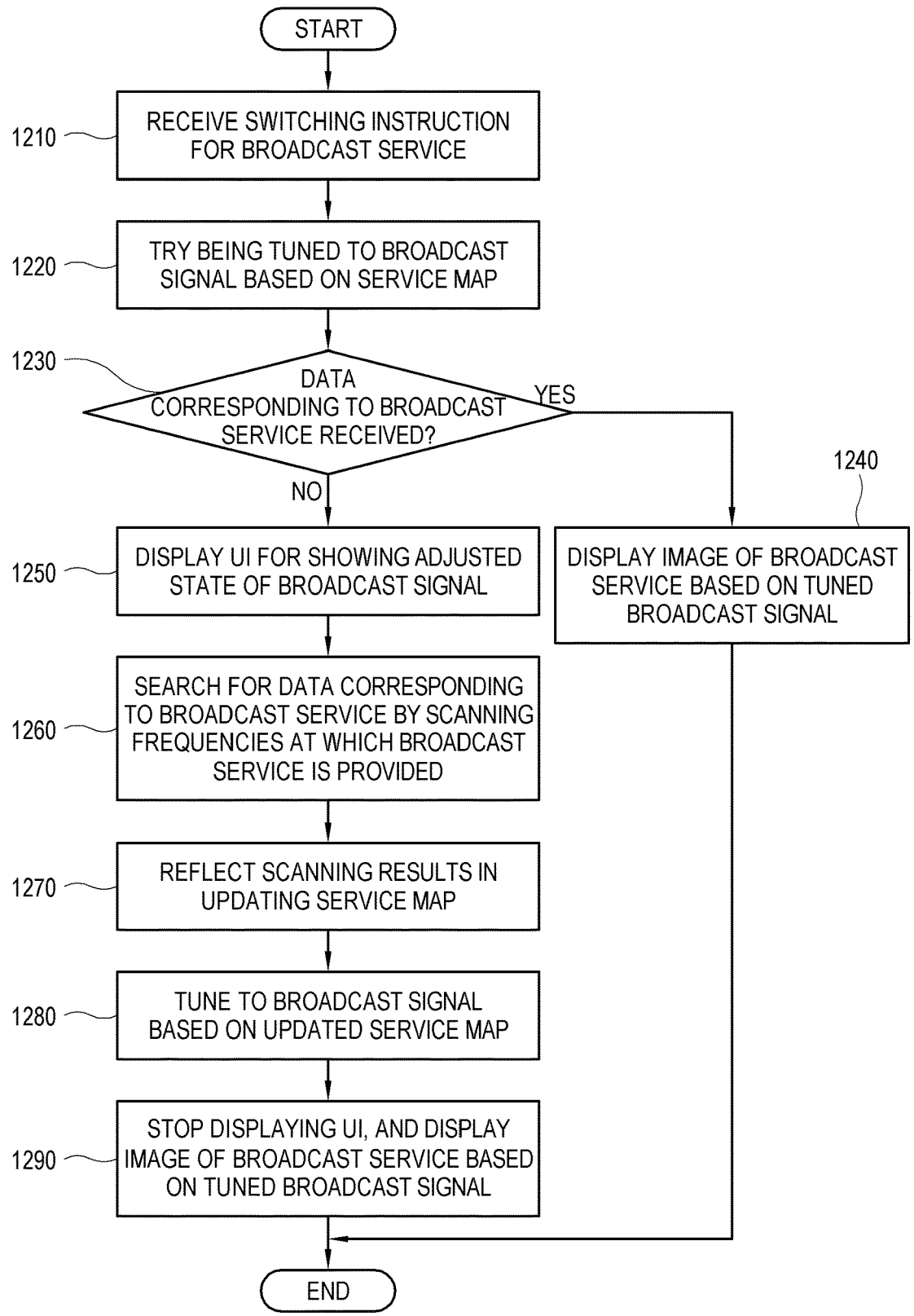
FIG. 12 is a flowchart of processing a broadcast signal in a broadcast receiving apparatus according to an embodiment.

FIG. 12 is a flowchart of processing a broadcast signal in a broadcast receiving apparatus according to an embodiment.

As shown in FIG. 12, at operation 1210 the broadcast receiving apparatus receives a user input including an instruction for switching to a certain broadcast service.

At operation 1220 the broadcast receiving apparatus attempts to tune to a broadcast signal corresponding to the broadcast service on the basis of a service map.

At operation 1230 the broadcast receiving apparatus determines whether preset data corresponding to the broadcast service is received by the tuning based on the service map. The preset data includes an LLS or an SLT.

When the data corresponding to the broadcast service is received (operation 1230—YES), at operation 1240 the broadcast receiving apparatus displays an image of the broadcast service based on the tuned broadcast signal.

On the other hand, when the data corresponding to the broadcast service is not received (operation 1230—NO), at operation 1250 the broadcast receiving apparatus displays a UI for showing an adjusted state of the broadcast signal.

At operation 1260 the broadcast receiving apparatus scans frequencies at which the broadcast service is provided, and thus searches for preset data corresponding to the broadcast service.

At operation 1270 the broadcast receiving apparatus reflects scanning results in updating the service map.

At operation 1280 the broadcast receiving apparatus is tuned to a broadcast signal on the basis of the updated service map.

At operation 1290 the broadcast receiving apparatus stops displaying the UI, and displays the image of the broadcast service based on the tuned broadcast signal.

As described in the foregoing embodiments, the broadcast receiving apparatus operates to update a service map when a user gives an instruction to switch over to a channel of a specific broadcast service. Meanwhile, a user may give an instruction to switch over to a channel different from the previously selected channel even though the operation of updating the service map has not been completed. In this case, when the broadcast receiving apparatus includes a single tuner and the tuner is being tuned to a certain channel for a broadcast signal, it is impossible to be tuned to another channel. To cope with this case, proper operations are required. Below, an embodiment of the operations for coping with this case will be described.

Figure 13:
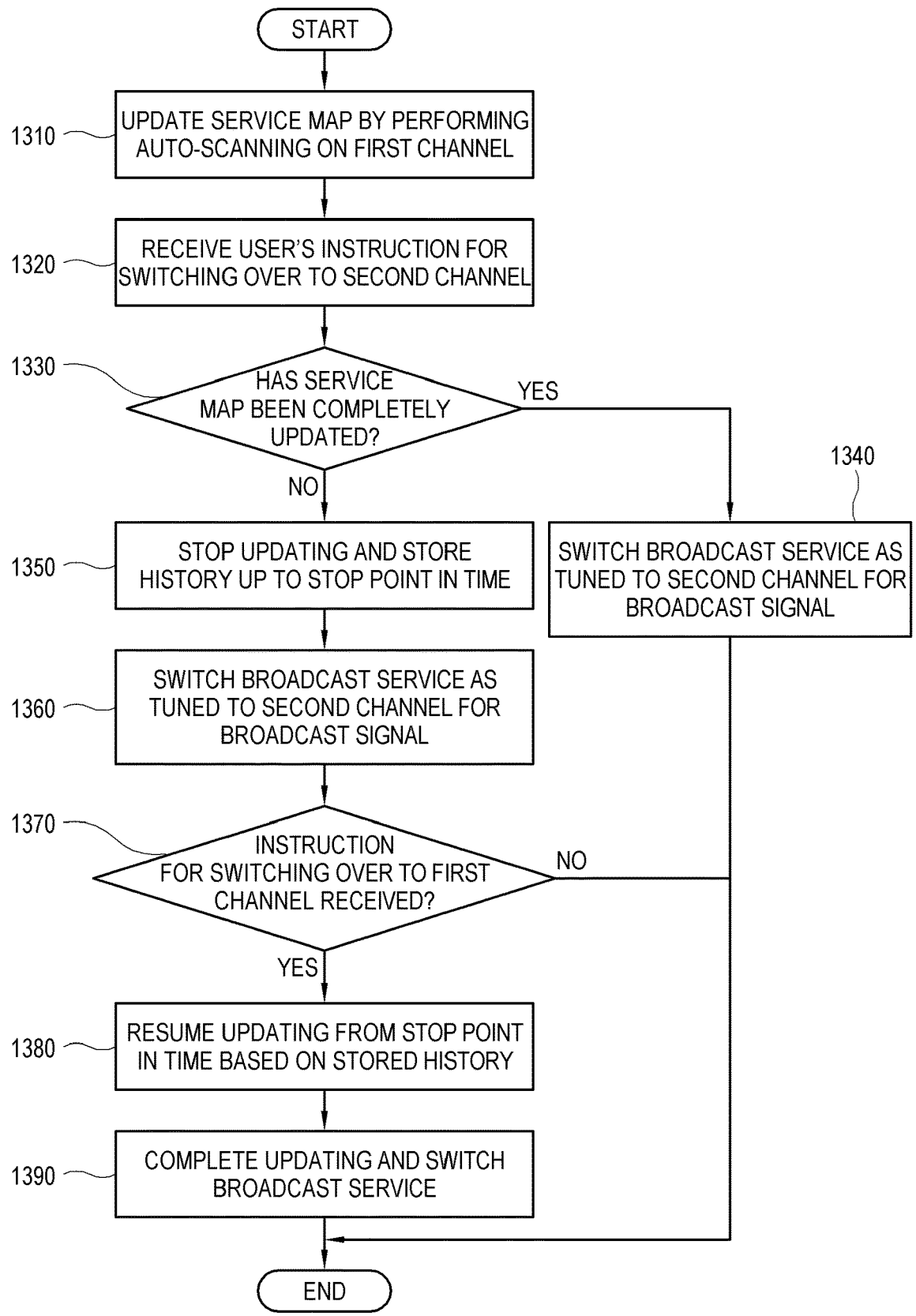
FIG. 13 is a flowchart of processing a broadcast signal according to an embodiment.

FIG. 13 is a flowchart of processing a broadcast signal according to an embodiment.

As shown in FIG. 13, at operation 1310 the broadcast receiving apparatus updates the service map by performing auto-scanning on a first channel when the service map about the broadcast service at the frequency of the first channel does not match with that of the broadcast signal. Redundant descriptions of operation 1310 described with respect to the foregoing embodiments will be omitted. In this operation, the tuner of the broadcast receiving apparatus is tuned to the first frequency.

At operation 1320 the broadcast receiving apparatus receives a user's instruction for switching to a broadcast service of a second channel.

At operation 1330 the broadcast receiving apparatus determines whether the service map has been completely updated.

When the service map has been completely updated (operation 1330—YES), at operation 1340 the broadcast receiving apparatus switches to the second channel as tuned to the frequency of the second channel for the broadcast signal.

On the other hand, when the service map has not been completely updated (operation 1330—NO), at operation 1350 the broadcast receiving apparatus stops updating the service map and stores a history of updating operations up to a stop point in time at which the user input was received.

At operation 1360 the broadcast receiving apparatus switches to the second channel as tuned to the broadcast signal corresponding the frequency of the second channel.

At operation 1370 the broadcast receiving apparatus determines whether a user gives an instruction for switching to the first channel. When this switching instruction is not received (operation 1370—NO), the broadcast receiving apparatus does not perform any specific operation.

When the switching instruction is received (operation 1370—YES), at operation 1380 the broadcast receiving apparatus calls for the history of the updating operations for the service map stored in the previous operation 1350, and resumes the updating operation for the service map from the stop point in time.

At operation 1390 the broadcast receiving apparatus completely updates the service map, and switches over to the first channel as tuned to the broadcast signal corresponding to the first channel.

When the broadcast receiving apparatus includes only one tuner, such operations may be required. While the tuner performs auto-scanning with regard to the frequency of the first channel, the tuner cannot be tuned to the frequency of the second channel at the same time. Therefore, when an instruction for switching over to the second channel is received even though the auto-scanning on the first frequency and the updating operation for the service map have not been completely updated, the broadcast receiving apparatus first stops operations related to the first channel to store a history of operations, and then resumes the stopped operation in the future where a condition that the tuner is usable for the first channel.

Here, the point in time to resume updating the service map may not be limited to only the time when the instruction for switching over to the first channel is received. As long as the tuner is usable for the first channel, it is possible to resume the updating operation. Alternatively, the updating operation may be resumed at a point in time when the tuner is not in use like a case where the broadcast signal is processed in the broadband mode or a case where a network application is used.

However, when the broadcast receiving apparatus includes a multi-tuner, i.e. two or more tuners, another alternative embodiment is also possible. For example, when an instruction for switching to the second channel is received while the first tuner is performing the auto-scanning on the first channel, the first tuner continues to perform the auto-scanning and the second tuner is tuned to the broadcast signal corresponding to the second channel and provides the broadcast service.

Meanwhile, the foregoing embodiments are related to the method of coping with the change when the broadcast receiving apparatus is not notified of the change in the service configuration of the broadcast signal by the broadcast service provider. However, it may be designed to periodically notify the change by the broadcast service provider or the third party, and an embodiment will be described in this regard.

Figure 14:
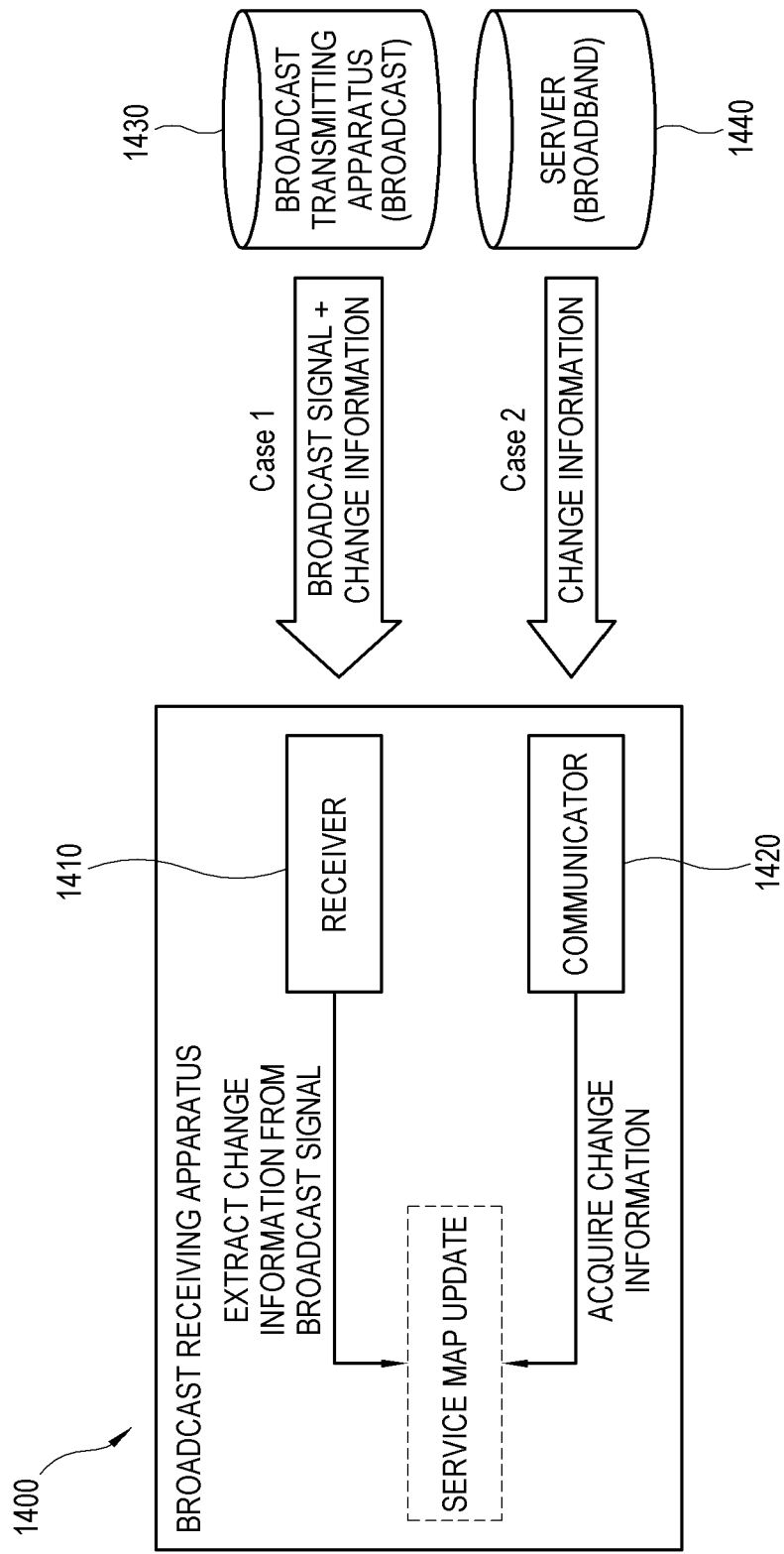
FIG. 14 illustrates various modes for receiving change information about a broadcast signal in a broadcast receiving apparatus according to an embodiment.

FIG. 14 illustrates various modes for receiving change information about a broadcast signal in a broadcast receiving apparatus according to an embodiment.

As shown in FIG. 14, a broadcast receiving apparatus 1400 may receive data from a broadcast transmitting apparatus 1430 that transmits a broadcast signal in a broadcast mode, and data from a server 1440 that transmits a packet in a broadband mode. The broadcast receiving apparatus 1400 includes a receiver 1410 for receiving a broadcast signal from the broadcast transmitting apparatus 1430, and a communicator 1420 for receiving a data packet from the server 1440, and descriptions thereof are equivalent to those of the foregoing embodiments.

In this embodiment, when the service configuration of the broadcast signal received from the broadcast transmitting apparatus 1430 is changed, a provider of a broadcast service may notify the broadcast receiving apparatus 1400 of the changes. When receiving change information about the changes in the broadcast signal, the broadcast receiving apparatus 1400 updates a previously stored service map on the basis of the change information. The change information may include various pieces of content, which includes changed content among items of the service map. For example, the change information includes at least a piece of information changed in the broadcast signal at a current point in time, among items such as a frequency number, ID of a broadcast service, ID of a PLP including signaling information of the broadcast service, ID of an PLP including the broadcast service, etc.

To acquire the change information, the broadcast receiving apparatus 1400 may use two methods. As one of the methods (case 1), the change information may be received in the receiver 1410 as embedded in the broadcast signal transmitted from the broadcast transmitting apparatus 1430. The broadcast transmitting apparatus 1430 records the change information in a preset data field when a broadcast signal is generated, and transmits the broadcast signal. The broadcast receiving apparatus 1400 acquires the change information recorded in the data field, while processing the broadcast signal received in the receiver 1410. As the other method (case 2), the change information may be received in the communicator 1420 from the server 1440 through a broadband network. The broadcast receiving apparatus 1400 updates the service map on the basis of such acquired change information.

When the change information is received at a certain point in time, the broadcast receiving apparatus 1400 may directly update the service map at the corresponding point in time. Further, when the change information includes schedule information about date and time on which the broadcast signal is changed, the broadcast receiving apparatus 1400 is storing the change information and updates the service map on the date and time indicated in the schedule information. In a case of using the schedule information, the broadcast service provider may change the broadcast signal at dawn time zone when relatively fewer users are viewing the broadcast service, and the broadcast receiving apparatus 1400 may update the service map while a user is sleeping.

In the foregoing embodiments, it is determined whether the service configuration of the broadcast signal has been changed, in response to a user's instruction for switching to a broadcast service corresponding to a certain frequency. However, such a trigger event for implementing the determination is not limited to the foregoing embodiments.

There are many cases where the broadcast receiving apparatus does not use the tuner. For example, the broadcast receiving apparatus may process a broadcast signal of the broadband mode to provide a broadcast service, or may use various applications such as a web browser or the like without using the tuner. The broadcast receiving apparatus may periodically determine whether the service configuration of the broadcast signal has been changed or not with respect to a certain frequency, while the tuner is not otherwise in use.

The methods according to the foregoing embodiments may be achieved in the form of a program instructions that can be executed in various computers, and recorded in a computer readable medium. Such a computer readable medium may include a program instruction, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a computer program having instructions for realizing the exemplary embodiments. The program command recorded in this storage medium may be specially designed and configured according to the exemplary embodiments, or may be publicly known and available to those skilled in the art of computer software.

Although a few embodiments have been shown and described, it will be appreciated by those skilled in the art that changes may be made in these embodiments without departing from the principles and spirit of the disclosure, the scope of which is defined in the appended claims and their equivalents.

What is claimed is:

1. A broadcast receiving apparatus comprising:
a memory;
a receiver configured to receive a broadcast signal, the broadcast signal comprising data of a plurality of channels and signaling information;
a processor configured to process the broadcast signal, the processor configured to:
perform a scanning operation with respect to a plurality of frequency bands of the broadcast signal,
store service map information with respect to the plurality of frequency bands in the memory based the scanning operation, wherein the service map information is configured to be used to tune the plurality of channels,
identify whether the signaling information, for tuning to one channel of the plurality of channels, included in the service map information stored in the memory is valid based on the broadcast signal currently received by the receiver, and
in response to identifying that the signaling information in the service map information is not valid, update the service map information by scanning a frequency band corresponding to the one channel, among the plurality of frequency bands in the broadcast signal.

2. The broadcast receiving apparatus according to claim 1, wherein the broadcast signal comprises the data of the plurality of channels to be transmitted through a plurality of sub frames within a certain frequency frame, and
wherein the processor is further configured to identify that the signaling information is valid, when the one channel is selected and a sub frame of the one channel does not match with the broadcast signal, the sub frame being designated in the service map information.

3. The broadcast receiving apparatus according to claim 2, wherein the service map information designates an identification (ID) of a sub frame that provides the signaling information to determine the one channel among the plurality of sub frames, and
the processor is further configured to determine that the signaling information is valid in response to determining that the sub frame of the broadcast signal having the ID designated in the service map information does not include the signaling information.

4. The broadcast receiving apparatus according to claim 3, wherein each of sub frames among the plurality of sub frames of the broadcast signal comprises flag information for indicating whether the signaling information is included therein, and
the processor is further configured to determine whether each sub frame includes the signaling information based on the flag information.

5. The broadcast receiving apparatus according to claim 1, wherein, when the one channel is selected and no data of the one channel is acquired from the broadcast signal tuned based on the service map information, the processor is further configured to search for data of the one channel by scanning a frequency band of the one channel and update the service map information according to results of the search.

6. The broadcast receiving apparatus according to claim 5, wherein the processor displays a user interface (UI) for informing a scanning operation state while scanning the frequency band of the one channel, and displays an image corresponding to the one channel without displaying the UI when the service map information is completely updated.

7. The broadcast receiving apparatus according to claim 1, wherein, when the one channel is selected and the broadcast signal is scanned, the processor is further configured to scan the frequency band corresponding to the one channel within a full frequency band of the broadcast signal.

8. The broadcast receiving apparatus according to claim 1, wherein the processor is further configured to stop an updating operation and store a progress history of the updating operation when the one channel is selected and an instruction for switching to another frequency band is received at a first point in time during the updating operation for the service map information, and resume the updating operation based on the progress history when an instruction for switching over to the frequency band corresponding to the one channel is received at a second point in time after the first point in time.

9. The broadcast receiving apparatus according to claim 1, wherein the broadcast signal complies with Advanced Television Systems Committee (ATSC) 3.0 standard.

10. The broadcast receiving apparatus according to claim 1, wherein the processor is further configured to tune to the one channel based on the service map information stored in the memory in response to selection of the one channel and the service map information stored in the memory is valid.

11. A method of controlling a broadcast receiving apparatus, the method comprising:
receiving a broadcast signal, the broadcast signal comprising data of a plurality of channels and signaling information;
performing a scanning operation with respect to a plurality of frequency bands of a broadcast signal;
storing service map information with respect to the plurality of frequency bands based on the scanning operation in a memory, wherein the service map information is configured to be used to tune the plurality of channels;
identifying whether the signaling information, for tuning to one channel of the plurality of channels, included in the service map information stored in the memory is valid based on the broadcast signal; and
updating the service map information by scanning a frequency band corresponding to the one channel, among the plurality of frequency bands in the broadcast signal, in response to identifying that the signaling information in the service map information is not valid.

12. The method according to claim 11, wherein the broadcast signal comprises the data of the plurality of channels to be transmitted through a plurality of sub frames within a certain frequency frame, and
the identifying comprises determining that the signaling information is valid, when the one channel is selected and a sub frame of the one channel does not match with the broadcast signal, the sub frame being designated in the service map information.

13. The method according to claim 12, wherein the service map information designates an identification (ID) of a sub frame that provides the signaling information to determine the one channel among the plurality of sub frames, and
the identifying comprises determining that the signaling information is valid in response to determining that the sub frame of the broadcast signal having the ID designated in the service map information does not include the signaling information.

14. The method according to claim 13, wherein each of sub frames among the plurality of sub frames of the broadcast signal comprises flag information for indicating whether the signaling information is included therein, and
wherein the identifying comprises determining whether each sub frame includes the signaling information based on the flag information.

15. The method according to claim 11, wherein the updating comprises searching for data of the one channel by scanning a frequency band of the one channel and updating the service map information according to results of the searching when the one channel is selected and no data of the one channel is acquired from the broadcast signal tuned based on the service map information.

16. The method according to claim 15, wherein the updating comprises displaying a user interface (UI) for informing a scanning operation state while scanning the frequency band of the one channel, and displaying an image corresponding to the one channel without displaying the UI when the service map information is completely updated.

17. The method according to claim 11, wherein the updating comprises scanning the frequency band corresponding to the one channel within a full frequency band of the broadcast signal when the one channel is selected and the broadcast signal is scanned.

18. The method according to claim 11, wherein the updating comprises:
stopping an updating operation and storing a progress history of the updating operation when the one channel is selected and an instruction for switching over to another frequency band is received at a first point in time during the updating operation for the service map information; and
resuming the updating operation based on the progress history when an instruction for switching over to the frequency band corresponding to the one channel is received at a second point in time after the first point in time.

19. The method according to claim 11, wherein the broadcast signal complies with Advanced Television Systems Committee (ATSC) 3.0 standard.

* * * * *